United States Patent
Hojati et al.

(10) Patent No.: US 10,511,853 B2
(45) Date of Patent: Dec. 17, 2019

(54) METHOD AND SYSTEM FOR PARALLEL RATE-CONSTRAINED MOTION ESTIMATION IN VIDEO CODING

(71) Applicant: ECOLE DE TECHNOLOGIE SUPERIEURE, Montreal, QC (CA)

(72) Inventors: Esmaeil Hojati, Montreal (CA); Jean-Francois Franche, Montreal (CA); Stephane Coulombe, Montreal (CA); Carlos Vazquez, Montreal (CA)

(73) Assignee: ECOLE DE TECHNOLOGIE SUPERIEURE, Montreal (CA)

(*) Notice: Subject to any disclaimer, the term of this patent is extended or adjusted under 35 U.S.C. 154(b) by 0 days.

(21) Appl. No.: 15/822,030

(22) Filed: Nov. 24, 2017

(65) Prior Publication Data

US 2018/0146208 A1    May 24, 2018

Related U.S. Application Data

(60) Provisional application No. 62/426,312, filed on Nov. 24, 2016.

(51) Int. Cl.
| | |
|---|---|
| *H04N 19/96* | (2014.01) |
| *H04N 19/517* | (2014.01) |
| *H04N 19/567* | (2014.01) |
| *H04N 19/52* | (2014.01) |
| *H04N 19/436* | (2014.01) |

(52) U.S. Cl.
CPC ......... *H04N 19/517* (2014.11); *H04N 19/436* (2014.11); *H04N 19/52* (2014.11); *H04N 19/567* (2014.11); *H04N 19/96* (2014.11)

(58) Field of Classification Search
CPC .... H04N 19/517; H04N 19/52; H04N 19/436; H04N 19/567; H04N 19/96
USPC ....................................... 375/240.16
See application file for complete search history.

(56) References Cited

U.S. PATENT DOCUMENTS

| | | | | |
|---|---|---|---|---|
| 5,818,536 A | * | 10/1998 | Morris ................. | H04N 19/105 375/240.15 |
| 6,205,177 B1 | * | 3/2001 | Girod ..................... | H04N 19/46 375/240.14 |

(Continued)

OTHER PUBLICATIONS

Hojati et al, Massively parallel rate-constrained motion estimation using multiple temporal predictions in HEVC (Year: 2017).*

(Continued)

*Primary Examiner* — Shan E Elahi
(74) *Attorney, Agent, or Firm* — IP-Mex Inc.; Victoria Donnelly

(57) ABSTRACT

Methods and systems for parallel rate-constrained motion estimation in a video encoder are provided. Embodiments of the present invention provide a solution for the problem of the reliance upon spatial dependencies when processing parallel RCME on a frame. In order to solve this problem, embodiments of the present invention determine a list of at least two Motion Vector Predictor Candidates (MVPC), determine, in parallel for at least two of said at least two MVPCs, corresponding Motion Vector Candidates (MVC) using Rate-Constrained Motion Estimation (RCME) and determine the optimal Motion Vector (MV) among the determined MVCs based on rate distortion optimization.

24 Claims, 11 Drawing Sheets

(56) References Cited

U.S. PATENT DOCUMENTS

| | | | | |
|---|---|---|---|---|
| 6,249,318 B1* | 6/2001 | Girod | H04N 19/46 | 375/240.16 |
| 6,414,992 B1* | 7/2002 | Sriram | H04N 19/56 | 375/240.02 |
| 6,560,284 B1* | 5/2003 | Girod | H04N 19/46 | 375/240.12 |
| 6,807,231 B1* | 10/2004 | Wiegand | H04N 19/51 | 375/240.12 |
| 7,072,397 B2* | 7/2006 | Sriram | H04N 19/56 | 375/240.13 |
| 7,782,953 B2* | 8/2010 | Sriram | H04N 19/56 | 375/240.16 |
| 7,822,118 B2* | 10/2010 | Haskell | H04N 19/176 | 375/240.02 |
| 8,208,536 B2* | 6/2012 | Pun | H04N 19/159 | 375/240.03 |
| 8,300,693 B2* | 10/2012 | Flierl | H04N 19/615 | 375/240.12 |
| 8,355,436 B2* | 1/2013 | Haskell | H04N 19/176 | 375/240.03 |
| 8,457,202 B2* | 6/2013 | Wang | H04N 19/197 | 375/240.13 |
| 8,750,377 B2* | 6/2014 | Divorra Escoda | H04N 19/159 | 375/240.12 |
| 8,781,002 B2* | 7/2014 | Dumitras | H04N 19/00 | 375/240.26 |
| 9,497,472 B2* | 11/2016 | Coban | H04N 19/176 | |
| 9,843,813 B2* | 12/2017 | Cote | H04N 19/439 | |
| 9,860,558 B2* | 1/2018 | Zhang | H04N 19/593 | |
| 2003/0063667 A1* | 4/2003 | Sriram | H04N 19/56 | 375/240.05 |
| 2006/0159179 A1* | 7/2006 | Flierl | H04N 19/63 | 375/240.16 |
| 2006/0239355 A1* | 10/2006 | Sriram | H04N 19/56 | 375/240.16 |
| 2007/0153892 A1* | 7/2007 | Yin | H04N 19/176 | 375/240.03 |
| 2010/0239015 A1* | 9/2010 | Wang | H04N 19/197 | 375/240.16 |
| 2011/0002391 A1* | 1/2011 | Uslubas | H04N 19/176 | 375/240.16 |
| 2013/0259116 A1* | 10/2013 | Chan | H04N 19/90 | 375/240.02 |
| 2014/0126638 A1* | 5/2014 | Sievers | H04N 19/567 | 375/240.16 |
| 2014/0219342 A1* | 8/2014 | Yu | H04N 19/50 | 375/240.12 |
| 2014/0301466 A1* | 10/2014 | Li | H04N 19/597 | 375/240.16 |
| 2014/0301467 A1* | 10/2014 | Thirumalai | H04N 19/597 | 375/240.16 |
| 2015/0036749 A1* | 2/2015 | Jeon | H04N 19/55 | 375/240.16 |
| 2015/0163512 A1* | 6/2015 | Cai | H04N 19/593 | 375/240.12 |
| 2015/0208084 A1* | 7/2015 | Zhu | H04N 19/105 | 375/240.02 |
| 2015/0373349 A1* | 12/2015 | Zhang | H04N 19/196 | 375/240.02 |
| 2016/0100163 A1* | 4/2016 | Rapaka | H04N 19/117 | 375/240.16 |
| 2016/0100189 A1* | 4/2016 | Pang | H04N 19/593 | 375/240.13 |
| 2016/0198171 A1* | 7/2016 | Wu | H04N 19/436 | 375/240.16 |
| 2017/0238005 A1* | 8/2017 | Chien | H04N 19/513 | 375/240.16 |

OTHER PUBLICATIONS

Hojati et al, Massively parallel rate-constrained motion estimation using multiple temporal predictors in HEVC (Year: 2017).*

B. Bross, W. J. Han, J. R. Ohm, G. J. Sullivan, Y. K. Wang, and T. Wiegand, "High Efficiency Video Coding (HEVC) text specification draft 10." document JCTVC-L1003, ITU-T/ISO/IEC Joint Collaborative Team on Video Coding (JCT-VC), Jan. 2013.

D. Grois, D. Marpe, A. Mulayoff, B. Itzhaky, and O. Hadar, "Performance comparison of h. 265/mpeg-hevc, vp9, and h. 264/mpeg-avc encoders," in Picture Coding Symposium (PCS), 2013, 2013, pp. 394-397.

G. J. Sullivan, J. Ohm, W. Han, and T. Wiegand, "Overview of the High Efficiency Video Coding," IEEE Trans. Circuits Syst. Video Technol., vol. 22, No. 12, pp. 1649-1668, 2012.

F. Bossen, B. Bross, S. Karsten, and D. Flynn, "HEVC Complexity and Implementation Analysis," IEEE Trans. Circuits Syst. Video Technol., vol. 22, No. 12, pp. 1685-1696, 2013.

C. C. Chi, M. Alvarez-mesa, B. Juurlink, G. Clare, T. Schierl, F. Henry, and S. Pateux, "Parallel Scalability and Efficiency of HEVC Parallelization Approaches," IEEE Trans. Circuits Syst. Video Technol., vol. 22, No. 12, pp. 1827-1838, 2012.

K. Misra, A. Segall, M. Horowitz, S. Xu, A. Fuldseth, and M. Zhou, "An Overview of Tiles in HEVC," IEEE J. Sel. Top. Signal Process., vol. 7, No. 6, pp. 969-977, Dec. 2013.

Q. Yu, L. Zhao, and S. Ma, "Parallel AMVP candidate list construction for HEVC," Vis. Commun. Image Process., 2012.

C. Yan, Y. Zhang, J. Xu, F. Dai, J. Zhang, Q. Dai, and F. Wu, "Efficient Parallel Framework for HEVC Motion Estimation on Many-Core Processors," IEEE Trans. Circuits Syst. Video Technol., vol. 24, No. 12, pp. 2077-2089, 2014.

W. Chen and H. Hang, "H.264/AVC motion estimation implementation on compute unified device architecture (CUDA)," IEEE Int. Conf. Multimed. Expo, pp. 697-700, 2008.

M. U. Shahid, A. Ahmed, and E. Magli, "Parallel rate-distortion optimised fast motion estimation algorithm for H. 264/AVC using GPU," in Picture Coding Symposium (PCS), 2013, 2013, pp. 221-224.

Y. Gao and J. Zhou, "Motion vector extrapolation for parallel motion estimation on GPU," Multimed. Tools Appl., vol. 68, No. 3, pp. 701-715, Mar. 2014.

S. Radicke, J. Hahn, C. Grecos, and Q. Wang, "A highly-parallel approach on motion estimation for high efficiency video coding (HEVC)," IEEE Int. Conf. Consum. Electron., pp. 187-188, Jan. 2014.

X. Jiang, T. Song, T. Shimamoto, and L. Wang, "High efficiency video coding (HEVC) motion estimation parallel algorithms on GPU," IEEE Int. Conf. Consum. Electron.—Taiwan, pp. 115-116, May 2014.

Z. Chen, J. Xu, Y. He, and J. Zheng, "Fast integer-pel and fractional-pel motion estimation for H. 264/AVC," J. Vis. Commun. Image Represent., vol. 17, No. 2, pp. 264-290, 2006.

"Joint Collaborative Team on Video Coding Reference Software, ver. HM 15.0." [Online]. Available: http://hevc.hhi.fraunhofer.de/.

"The open standard for parallel programming of heterogeneous systems," Khronos Group. [Online]. Available: https://www.khronos.org/opencl/.

F. Bossen, "JCTVC-L1100: Common HM test conditions and software reference configurations. JCT-VC Document Management System (Apr. 2013)." 2013.

G. Bjøntegaard, "Improvements of the BD-PSNR model." ITU-T SG16/Q6 Video Coding Experts Group (VCEG), Document VCEG-AI11, Berlin, Germany, Jul. 16, 2008.

S. Momcilovic and L. Sousa, "Development and evaluation of scalable video motion estimators on GPU," in Signal Processing Systems, 2009. SiPS 2009. IEEE Workshop on, 2009, pp. 291-296.

J. Ma, F. Luo, S. Wang, and S. Ma, "Flexible CTU-level parallel motion estimation by CPU and GPU pipeline for HEVC," in Visual Communications and Image Processing Conference, 2014 IEEE, 2014, pp. 282-285.

* cited by examiner

900

| PU | ☐ | ☐ | ☐ | ☐ | ☐ | ... | ☐ |
|---|---|---|---|---|---|---|---|
| WG | 1 | 2 | 3 | 4 | 5 | ... | 425 |
| $PU_{Location}$ | 0,0 | 0,0 | 32,0 | 0,0 | 0,32 | ... | 60,56 |
| $PU_{Size}$ | 64x64 | 64x32 | 64x32 | 32x64 | 32x64 | ... | 4x8 |

FIG. 9

METHOD AND SYSTEM FOR PARALLEL RATE-CONSTRAINED MOTION ESTIMATION IN VIDEO CODING

CROSS REFERENCES TO RELATED APPLICATIONS

This application claims the benefit from U.S. Provisional Application Ser. No. 62/426,312 filed Nov. 24, 2016 entitled METHOD AND SYSTEM FOR PARALLEL RATE-CONSTRAINED MOTION ESTIMATION IN VIDEO CODING, the entire contents of which are incorporated herein by reference.

FIELD OF THE INVENTION

The present invention relates generally to video coding, and in particular to parallel rate-constrained motion estimation in video coding.

BACKGROUND OF THE INVENTION

Current advances in display manufacturing will increase usage of high quality video like high definition (HD) and Ultra HD (4K MD and 8K UHD). Video stream delivery for these users demands new and improved video coding technology. The latest hybrid video compression standard, H.265/HEVC, was developed by the Joint Collaborative Team on Video Coding (JCT-VC) established by ISO/IEC MPEG and ITU-T VCEG. Although HEVC doubles the compression ratio of popular H.264/AVC standard at the same video quality, the computational complexity is considerably higher. Most of its coding complexity is due to rate-constrained motion estimation (RCME).

HEVC is based on hybrid architecture as its predecessor standard, H.264/AVC, however, numerous improvements have been made in the frame splitting, inter and intra prediction modes, transformation, in-loop filtering and entropy coding of the new design. The coding improvement of HEVC is obtained at the expense of higher computational complexity in the encoder structure. This means that coding a video sequence for real-time applications needs more powerful hardware. In addition, a single processor with existing technology is not able to deliver such computation demand. However, during the last few years, highly parallel processing devices such as graphics processing units (GPUs) or many-core central processing units (CPUs) have been developed and utilized to accelerate such complex tasks.

High-level parallelization tools in HEVC, like wavefront parallel processing (WPP) and tiles, allow processing several Coding Tree Units (CTUs) in parallel. For example, the maximum number of concurrent processes is equal to the number of CTU rows when WPP is used to encode one frame. This number increases significantly when a variant of WPP, called overlapped wavefront (OWF), is used to encode several frames simultaneously. At the cost of a lower coding efficiency, the degree of parallelism can be increased by using tiles or slices in addition to WPP/OWF. Hence, the parallel encoding of CTUs is usually sufficient to maintain a multi-core CPU fully occupied most of the time, especially for high resolutions. However, it cannot provide enough parallelization for a many-core CPU or a heterogeneous architecture having CPU and GPU.

In order to increase the degree of parallelization, prior art methods process in parallel RCME on several PUs. The main challenge of these methods is to determine the best motion vector (MV) for a PU without knowing its motion vector predictors (MVPs). Most of prior art methods estimate these MVPs by using MVs from already encoded CTUs by estimating the MVPs from neighboring CTUs using spatial information.

One prior art method performs parallel motion estimation (ME) on heterogeneous architectures for a whole frame. This method calculates motion vectors of entire frame blocks in parallel. However, the MVP is ignored resulting in poor rate-distortion (RD) performance. Another prior art method utilizes the collocated motion vectors of the previous frame and extrapolates the motion vectors into the encoding frame. Although these methods achieve fine-grained parallelism suitable for a GPU, the prediction of MVPs can induce extra overhead for the CPU without significantly improving the RD performance.

An additional prior art method is directed toward a parallel implementation of RCME which uses the GPU as pre-processor by calculating the sum of absolute differences (SADs) for the whole search region, and transferred the results back to the CPU. This prior art method achieves better RD performance because it preserves MVP dependencies. However, due to the high bandwidth usage for transferring an excessive amount of data, the time reduction is smaller than other methods.

The above-mentioned prior art methods have deficiencies. They either transfer the distortion values (SADs) for the whole search region back to the CPU requires very high bandwidth leading to a reduced speedup, or their attempt to predict the MVPs is regularly not accurate causing a negative impact on RD performance.

There is needed method that provides a high degree of parallelization well-suited for massively parallel architectures, while significantly improving RD performance, with similar time reduction.

SUMMARY OF THE INVENTION

The present invention provides methods and systems for motion estimation in video coding, and more particularly to improve processing of several Coding Tree Units (CTUs) in parallel.

According to an aspect of the present invention, there are methods and systems for processing of several Coding Tree Units (CTUs) in parallel using a RCME method that utilizes multiple predictors. In this aspect, the methods and systems, targeted at GPU/CPU heterogeneous architectures, perform RCME in two stages and uses multiple temporal motion vector (MTV) predictors. These methods and systems provide a high degree of parallelization well-suited for massively parallel architectures, while the RD performance is significantly improved compared to prior art methods, with similar time reduction. This aspect can be combined with high-level parallel tools like WPP, tiles and slices to reach a higher degree of parallelization and speed.

According to an aspect of the present invention there is provided a method for parallel rate-constrained motion estimation in a video encoder, the method including: using a hardware processor for: determining a list of at least two Motion Vector Predictor Candidates (MVPC), determining, in parallel for at least two of said at least two MVPCs, corresponding Motion Vector Candidates (MVC) using Rate-Constrained Motion Estimation (RCME); and determining the optimal Motion Vector (MV) among the determined MVCs based on rate distortion optimization.

In some aspects, the method includes determining corresponding MVCs using RCME data for each MVPC including determining a rate-constrained motion vector and a corresponding distortion value for each MVPC.

In some aspects, the method includes determining the optimal MV comprises determining the MVC having the lowest rate-distortion cost from the determined MVCs.

In some aspects, the method includes determining a motion vector for each MVPC utilizing the corresponding distortion value for each MVPC and an actual MVP value and selecting the motion vector having the lowest rate-distortion cost.

In some aspects, the method includes creating the list of at least two MVPCs from a set of motion vectors collected from at least one previously processed frame, the immediately past processed frame, a reference frame and/or at least one collocated block. For purposes of this application, a reference frame is a decoded copy of a previously encoded frame that will be used for inter-prediction of other frames. Additionally, for purposes of this application, a collocated block referred to a CTU block in a reference frame that is in the same location of the current CTU.

In some aspects, the method includes determining, in parallel for at least two of said at least two MVPCs, corresponding Motion Vector Candidates (MVC) using Rate-Constrained Motion Estimation (RCME) within a GPU.

In some aspects, the method includes determining a list of at least two Motion Vector Predictor Candidates (MVPC) and determining the optimal Motion Vector (MV) among the determined MVCs based on rate distortion optimization within a CPU.

In some aspects, the method includes determining, in parallel for at least two of said at least two MVPCs, corresponding Motion Vector Candidates (MVC) using Rate-Constrained Motion Estimation (RCME), wherein the RCME utilizes a sub-optimal search method within a GPU to estimate the MVCs. The sub-optimal search method has a search pattern having a fixed number of positions. The number of positions are a multiple of the number of threads associated with the GPU. Further, the RCME algorithm is performed on all of the threads. In the aspect, the search pattern is a nested diamond pattern.

According to another aspect of the invention there is provided a system for determining a best motion vector in a motion estimation process of a video encoder, the system comprising: a computer-readable storage medium having instructions stored thereon that, when executed, cause a processor to: determine a list of at least two Motion Vector Predictor Candidates (MVPC), determine, in parallel for at least two of said at least two MVPCs, corresponding Motion Vector Candidates (MVC) using Rate-Constrained Motion Estimation (RCME); and determine the optimal Motion Vector (MV) among the determined MVCs based on rate distortion optimization.

In some embodiments, the instructions cause the processor to determine corresponding MVCs using RCME data for each MVPC including the determination of a rate-constrained motion vector and a corresponding distortion value for each MVPC. Also in some embodiments, the instructions that cause the processor to determine the optimal MV cause the processor to determine the MVC having the lowest rate-distortion cost from the determined MVCs.

BRIEF DESCRIPTION OF THE DRAWINGS

Further features and advantages of the invention will be apparent from the following description of the embodiment, which is described by way of example only and with reference to the accompanying drawings.

FIG. 9 is an embodiment of a WG index in accordance with the present invention.

Figure 1:
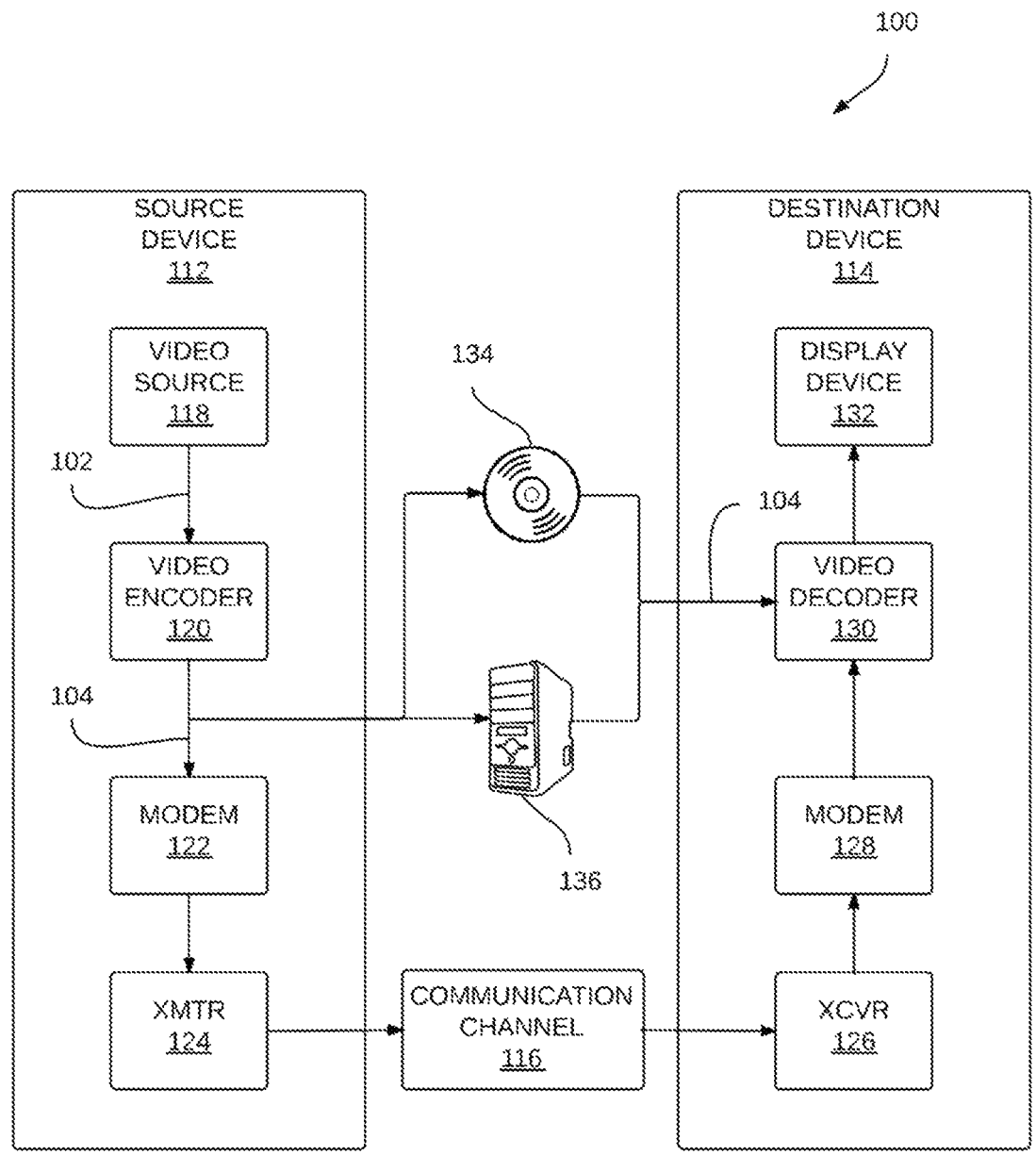
FIG. 1 is a block diagram of a video encoding system in accordance with embodiments of the present invention.

The accompanying drawings are included to provide a further understanding of the present invention and are incorporated in and constitute a part of this specification. The drawings illustrate some embodiments of the invention and together with the description serve to explain the principles of the invention. Other embodiments of the invention and many of the intended advantages of embodiments of the invention will be readily appreciated, as they become better understood by reference to the following detailed description. The elements of the drawings are not necessarily to scale relative to each other. Like reference numerals designate corresponding similar parts.

DETAILED DESCRIPTION OF THE INVENTION

The present invention provides an improved method and system relating generally to video coding, and in particular to parallel rate-constrained motion estimation in video coding.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalents; it is limited only by the claims.

The application of the inventive method and system to H.265/HEVC (HEVC) is illustrative and is not limiting. Those skilled in the art will recognize that previous standards, including H.264, are within the scope of the invention.

HEVC utilizes a quadtree structure called Coding Tree Units (CTUs) to partition each frame. The quadtree structure comprises blocks and units with maximum size of 64×64 pixels. A block includes a rectangular area of picture samples with related syntax information. A CTU can be recursively divided into units called Coding Units (CUs). A prediction unit (PU) is the basic unit for carrying the information related to the prediction process of a CU. Each CU may contain one or two PUs, each of which may be as large as the CU or as small as 8×4 or 4×8 in luma block size. The partitioning and selection of best modes is done by the rate distortion optimization (RDO) process.

Rate-constrained motion estimation (RCME) is a process which estimates the best temporal prediction parameters based jointly on rate and distortion for each PU. The result of the rate-constrained motion estimation process. i.e. the optimal vector of that process, can be called the rate-constrained motion vector. The sum of absolute differences (SAD) is used as a distortion measure (D) for integer precision motion vectors while the sum of absolute transformed differences (SATD) is used for fractional motion vectors. Moreover, the rate cost is a function of the motion vector difference with the motion vector predictor (MVP). The prediction parameters that result in the minimum cost are obtained as follows:

$$P_{ME} = (mv^*, mvp^*) = \underset{\substack{\forall mv \in MV_{search}, \\ mvp \in \{mvp_A, mvp_B\}}}{\operatorname{argmin}} \{D(mv) + \lambda \cdot R(mvp - mv)\} \quad (1)$$

where the two derived motion vector predictor candidates are denoted by mvpa and mvpb. These predictors are selected from neighboring PUs using the MVP derivation process determined by the HEVC standard. The constant $\lambda$ is a Lagrange multiplier. MVsearch is the search region composed of the set of integer motion vector coordinates over which the cost minimization process is performed. In addition, MVsearch is a set of paired integers that determines the displacement vector. The calculation of Equation 1 can be performed by different methods called search algorithms. The most straight forward search method is an exhaustive full search algorithm. However, more complex methods like Test Zone Search (TZSearch) can be used to find a sub-optimal result with less computation. For the full-search algorithm, MVsearch covers a square area determined by a search range (SR) variable as:

$$\text{MTP} = \{mvp_1, \ldots, mvp_N\}, N=16 \quad (2)$$

Because of the interpolation required by fractional pel motion estimation, performing it for the whole search range would impose an extremely large amount of calculations. Therefore, to overcome this problem, first, the RCME is performed for the integer motion vector, and then the fractional motion vector is determined around the best integer motion vector. Consequently, Equation 1 can be calculated by integer motion estimation (ME) followed by fractional motion estimation using the following equations:

$$P_{IME} = (imv^*, mvp^*) = \underset{\substack{imv \in MV_{search}, \\ mvp \in \{mvp_A, mvp_B\}}}{\operatorname{argmin}} \{SAD(imv) + \lambda \cdot R(mvp - imv)\} \quad (3)$$

$$P_{FME} = fmv^* = \underset{\substack{\forall fmv \in \{(imv+x, imv+y)\}, \\ |x| < 1, |y| < 1}}{\operatorname{argmin}} \{SATD(fmv) + \lambda \cdot R(mvp^* - fmv)\} \quad (4)$$

where imv* is the optimal integer motion vector, mvp* is the optimal motion vector predictor and fmv* is the optimal fractional motion vector. Specifically, for HEVC, x,y∈{0, ±¼,±½,±¾}. In many HEVC implementations, this step is performed by successively considering half-pel then quarter-pel precision and not all fractional positions are tested. From Equation 4, it can be observed that, to calculate RCME of PUs in parallel, the only unknown parameter is mvp because it is derived from neighbors. As a result, MVP is the main dependency in a framework for parallel RCME process.

FIG. 1 is a block diagram illustrating an example video encoding system 100 that may be configured to perform parallel rate-constrained motion estimation in video coding. As shown in the example of FIG. 1, system 100 includes a source device 112 that generates encoded video for decoding by destination device 114. The source device 112 may transmit the encoded video to a destination device 114 via a communication channel 116 or may store the encoded video on a storage medium 134 or a file server 136, such that the encoded video may be accessed by the destination device 114 as desired. The source device 112 and the destination device 114 may comprise any of a wide variety of devices, including desktop computers, notebook (i.e., laptop) computers, tablet computers, set-top boxes, telephone handsets (including cellular telephones or handsets and so-called smart phones), televisions, cameras, display devices, digital media players, video gaming consoles, or the like.

In many cases, such devices may be equipped for wireless communication. Hence, the communication channel 116 may comprise a wireless channel. Alternatively, the communication channel 116 may comprise a wired channel, a combination of wireless and wired channels or any other type of communication channel or combination of communication channels suitable for transmission of encoded video data, such as a radio frequency (RF) spectrum or one or more physical transmission lines. In some examples, communication channel 116 may form part of a packet-based network, such as a local area network (LAN), a wide-area network (WAN), or a global network such as the Internet. The communication channel 116, therefore, generally represents any suitable communication medium, or collection of different communication media, for transmitting video data from the source device 112 to the destination device 114, including any suitable combination of wired or wireless media. The communication channel 116 may include routers, switches, base stations, or any other equipment that may be useful to facilitate communication from the source device 112 to the destination device 114.

As further shown in the example of FIG. 1, source device 112 includes a video source 118, a video encoder 120, a modulator/demodulator 122 ("modem 122") and a transmitter 124. In source device 112, a video source 118 may include a source such as a video capture device. The video capture device, by way of example, may include one or more of a video camera, a video archive containing previously captured video, a video feed interface to receive video from a video content provider, and/or a computer graphics system for generating computer graphics data as the source video. As one example, if the video source 118 is a video camera, the source device 112 and the destination device 114 may form so-called camera phones or video phones. The techniques described in this disclosure, however, are not limited to wireless applications or settings, and may be applied to non-wireless devices including video encoding and/or decoding capabilities. The source device 112 and the destination device 114 are, therefore, merely examples of coding devices that can support the techniques described herein.

The video encoder 120 may encode the captured, pre-captured, or computer-generated video 102. Once encoded, the video encoder 120 may output this encoded video 104 to the modem 122. The modem 122 may then modulate the encoded video 104 according to a communication standard, such as a wireless communication protocol, whereupon a transmitter 124 may transmit the modulated encoded video data to destination device 114. The modem 122 may include various mixers, filters, amplifiers or other components designed for signal modulation. The transmitter 124 may include circuits designed for transmitting data, including amplifiers, filters, and one or more antennas.

The captured, pre-captured, or computer-generated video 102 that is encoded by the video encoder 120 may also be stored onto a storage medium 134 or a file server 136 for later retrieval, decoding and consumption. The storage medium 134 may include Blu-ray discs, DVDs, CD-ROMs, flash memory, or any other suitable digital storage media for storing encoded video 104. The destination device 114 may access the encoded video 104 stored on the storage medium 134 or the file server 136, decode this encoded video 104 to generate decoded video and playback this decoded video.

The file server 136 may be any type of server capable of storing encoded video and transmitting that encoded video 104 to the destination device 114. Example file servers include a web server (e.g., for a website), an FTP server, network attached storage (NAS) devices, a local disk drive, or any other type of device capable of storing encoded video 104 and transmitting it to a destination device. The transmission of encoded video 104 from file server 136 may be a streaming transmission, a download transmission, or a combination of both. The destination device 114 may access the file server 136 in accordance with any standard data connection, including an Internet connection. This connection may include a wireless channel (e.g., a Wi-Fi connection or wireless cellular data connection), a wired connection (e.g., DSL, cable modem, etc.), a combination of both wired and wireless channels or any other type of communication channel suitable for accessing encoded video 104 stored on a file server.

The destination device 114, in the example of FIG. 1, includes a receiver 126, a modem 128, a video decoder 130, and a display device 132. The receiver 126 of the destination device 114 receives information over the channel 116, and the modem 128 demodulates the information to produce a demodulated bit stream for the video decoder 130. The information communicated over the channel 116 may include a variety of syntax information generated by the video encoder 120 for use by the video decoder 130 in decoding the associated encoded video 104. Such syntax may also be included with the encoded video 104 stored on the storage medium 134 or the file server 136. Each of the video encoder 120 and the video decoder 130 may form part of a respective encoder-decoder (CODEC) that is capable of encoding or decoding video data.

The display device 132 of the destination device 114 represents any type of display capable of presenting video data for consumption by a viewer. Although shown as integrated with the destination device 114, the display device 132 may be integrated with, or external to, the destination device 114. In some examples, the destination device 114 may include an integrated display device and also be configured to interface with an external display device. In other examples, the destination device 114 may be a display device. In general, the display device 132 displays the decoded video data to a user, and may comprise any of a variety of display devices such as a liquid crystal display (LCD), a plasma display, an organic light emitting diode (OLED) display, or another type of display device.

The video encoder 120 and the video decoder 130 preferably operate according to a video compression standard, such as the High Efficiency Video Coding (HEVC) standard. The techniques of this disclosure, however, are not limited to any particular coding standard.

Although not shown in FIG. 1, in some aspects, the video encoder 120 and the video decoder 130 may each be integrated with an audio encoder and decoder, and may include appropriate MUX-DEMUX units, or other hardware and software, to handle encoding of both audio and video in a common data stream or separate data streams.

The video encoder 120 and the video decoder 130 each may be implemented as any of a variety of suitable encoder circuitry, such as one or more microprocessors, digital signal processors (DSPs), application-specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 120 and the video decoder 130 may be included in one or more encoders or decoders, either of which may be integrated as part of a combined encoder/decoder (CODEC) in a respective device.

Figure 2:
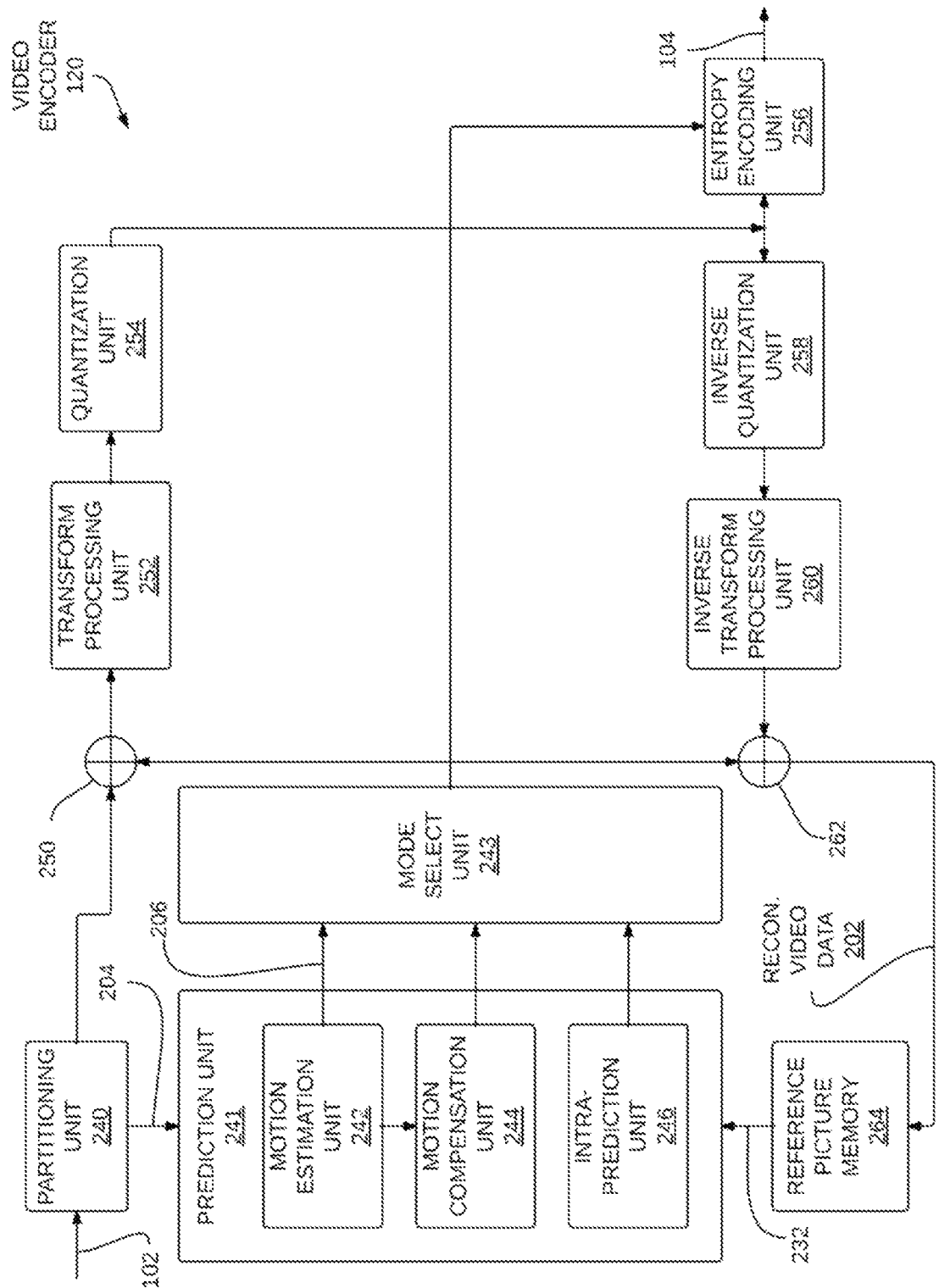
FIG. 2 is a block diagram of an embodiment of a video encoder shown in FIG. 1.

FIG. 2 is a block diagram illustrating an example of the video encoder 120 that may implement techniques for parallel rate-constrained motion estimation in video coding. The video encoder 120 may perform intra and inter coding of video blocks within video frames or slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, the video encoder 120 includes a memory device comprising computer readable instructions for execution by a processor, forming a partitioning unit 240, a prediction unit 241, a reference picture memory 264, a summer 250, a transform processing unit 252, a quantization unit 254, and an entropy encoding unit 256. The prediction unit 241 includes a motion estimation unit 242, a motion compensation unit 244, and an intra prediction unit 246. For video block reconstruction, the video encoder 120 also includes an inverse quantization unit 258, an inverse transform processing unit 260, and a summer 262. The video encoder 120 also includes a mode select unit 243. The mode select unit 243 may select one of the coding modes, intra or inter modes.

As shown in FIG. 2, video encoder 120 receives encoded video 102, and partitioning unit 240 partitions the encoded video 102 into video blocks 204. This partitioning may also include partitioning into slices, tiles, or other larger units, as wells as video block partitioning, e.g., according to a quadtree structure of CTUs and CUs. The video encoder 120 generally illustrates the components that encode video blocks within a video slice to be encoded. In general, a slice may be divided into multiple video blocks (and possibly into sets of video blocks referred to as tiles).

A mode select unit 243 may select one of a plurality of possible coding modes, such as one of a plurality of intra coding modes or one of a plurality of inter coding modes, for the current video block based on error results (e.g., coding rate and the level of distortion). A prediction unit 241 may provide the resulting intra- or inter-coded block to summer 250 to generate residual block data and to the summer 262 to reconstruct the encoded block for use as a reference picture. In some examples, the mode select unit 243 may analyze each of the reconstructed video blocks to select a best rate-to-distortion ratio through a process commonly referred to as rate-distortion optimization (RDO).

A motion estimation unit 242 and a motion compensation unit 244 within prediction unit 241 perform inter-predictive coding of the current video block relative to one or more predictive blocks in one or more reference pictures to provide temporal prediction. The motion estimation unit 242 may be configured to determine the inter-prediction mode for a video slice according to a predetermined pattern for a video sequence. The predetermined pattern may designate video slices in the sequence as P slices, B slices or generalized P and B (GPB) slices. The motion estimation unit 242 and the motion compensation unit 244 may be highly integrated, but are illustrated separately for conceptual purposes. Motion estimation, performed by the motion estimation unit 242, is the process of generating motion vectors 206, which estimate motion for video blocks. A motion vector 206, for example, may indicate the displacement of a video block within a current prediction unit (PU) in a video frame or picture relative to a predictive block within a reference picture. Motion estimation unit 242 might utilize the multi-predictor motion estimation.

A predictive block is a block that is found to closely match the video block of the PU to be coded in terms of pixel difference, which may be determined by sum of absolute differences (SAD), sum of square differences (SSD), or other difference metrics. In some examples, the video encoder 120 may calculate values for sub-integer pixel positions of reference pictures stored in reference picture memory 264. For example, video encoder 120 may interpolate values of one-quarter pixel positions, one-eighth pixel positions, or other fractional pixel positions of the reference picture. Therefore, motion estimation unit 242 may perform a motion search relative to the full pixel positions and fractional pixel positions and output a motion vector with fractional pixel precision.

The motion estimation unit 242 calculates a motion vector for a video block of a PU in an inter-coded slice by comparing the position of the PU to the position of a predictive block of a reference picture 232. The motion estimation for a PU may be performed for several probable parameters in parallel. Also, motion estimation for several PUs might be performed in parallel for multiple motion vector predictors. The results of motion estimation unit 242 may calculate motion estimation partially and a differed finial decision may be made in the mode select unit 243. The reference picture 232 may be selected from a first reference picture list (List 0) or a second reference picture list (List 1), each of which identify one or more reference pictures stored in the reference picture memory 264. The motion estimation unit 242 sends the calculated motion vector to entropy encoding unit 256 via the mode select unit 243, to mode select unit 24, and motion compensation unit 244.

Motion compensation, performed by the motion compensation unit 244, may involve fetching or generating the predictive block based on the motion vector determined by motion estimation, possibly performing interpolations to sub-pixel precision. Upon receiving the motion vector for the PU of the current video block, the motion compensation unit 244 may locate the predictive block to which the motion vector points in one of the reference picture lists. When the motion vector position in integer, no interpolation of the predictive block is required; it is only fetched. When the motion vector position in fractional, interpolation is required to obtain the predictive block with sub-pixel precision.

Typically, motion estimation is performed first using integer pel precision. The best integer pel motion vector is first found in a large search area and then the best fractional motion vector is found in a close neighborhood of that best integer pel motion vector. The fast method proposed here is applied to the integer pel phase since it includes significantly more motion vector candidates. The video encoder 120 forms a residual video block by subtracting pixel values of the predictive block from the pixel values of the current video block being coded, forming pixel difference values. The pixel difference values form residual data for the block, and may include both luma and chroma difference components. The summer 250 represents the component or components that perform this subtraction operation. The motion compensation unit 244 may also generate syntax elements associated with the video blocks and the video slice for use by video decoder HO in decoding the video blocks of the video slice.

The intra prediction unit 246 within the prediction unit 241 may perform intra-predictive coding of the current video block relative to one or more neighboring blocks in the same picture or slice as the current block to be coded to provide spatial compression. Accordingly, intra prediction unit 246 may intra-predict a current block, as an alternative to the inter-prediction performed by motion estimation unit 242 and motion compensation unit 244, as described above.

In particular, the mode select unit 243 may determine an intra prediction mode to use to encode a current block based on amounts of rate distortion corresponding to a given mode and block. In some examples, the intra prediction unit 246 may encode a current block using various intra prediction modes received from the mode select unit 243, e.g., during separate encoding passes.

The mode select unit 243 may calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, un-encoded block that was encoded to produce the encoded block, as well as a bit rate (that is, a number of bits) used to produce the encoded block. The select unit 243 may calculate ratios from the distortions and rates for the various encoded blocks to determine which intra prediction mode exhibits the best rate-distortion value for the block. According to the HEVC standard, there may be up to 35 intra prediction modes, and each intra prediction mode may be associated with an index.

When performing intra prediction, the mode select unit 243 may analyze an approximate cost associated with each possible intra prediction modes rather than performing full rate distortion analysis. This approximate cost may approximate a rate-distortion cost. Computing a full rate-distortion cost typically requires that the video encoder computes a predicted block using each of the intra prediction modes, determine a difference between each of the predicted blocks and the current block (which is commonly referred to as a "residual block" that specifies the residual pixel values referenced above), transform each of the residual blocks from the spatial domain to the frequency domain, quantize the coefficient values in each of the transformed residual blocks to generate a corresponding encoded video block of coefficients, and then decode the encoded video block, comparing each of the decoded reconstructed video blocks to the current block to determine a distortion metric to finally select the one with the lowest distortion value.

Figure 3:
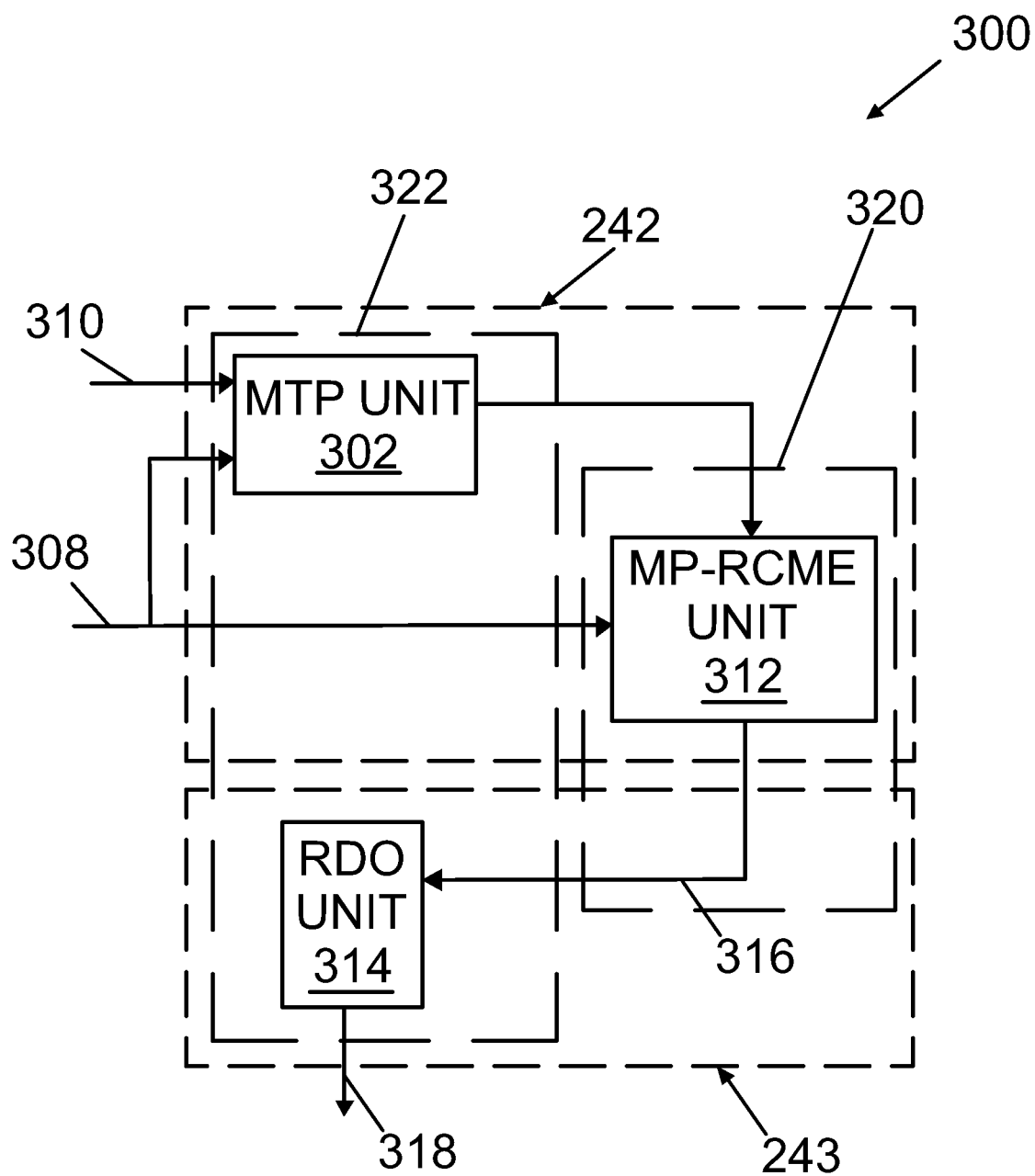
FIG. 3 is a block diagram of embodiments of a motion estimation unit and mode select unit shown in FIG. 3.

FIG. 3 shows a block diagram of the motion estimation unit 242 and mode select unit 243 shown in FIG. 2. The motion estimation unit 242 includes an embodiment of a candidate motion vector predictor (MVPC) unit referred as a multiple temporal predictor (MTP) unit 302 for creating a MTP list 306 for each CTU in current frame 308 to achieve better RD performance. A multiple temporal predictor is an embodiment of a Motion Vector Predictor Candidate that is obtained utilizing at least one past frame. The processing of each MTP list 306 by MTP unit 302 is performed by a CPU 322.

MTP list 306 is created from a set of motion vectors (MVs) that are the exact motion vectors of the collocated CTU in a previous frame 310 which is defined as:

$$mvp_i = mv_{ci}$$

$$MTP = \{mvp_1, \ldots, mvp_N\}, N=16 \quad (5)$$

where $mvp_i$ is a candidate MVP for the current block and is equal to the $i^{th}$ motion vector in the collocated CTU in previous frame 310. In other words, $mvp_i$ is the $i^{th}$ candidate from a MVP candidate list, where the MVP candidate list is made from a MTP list for a CTU and where each motion vector (MV) in the MTP list is considered to be a motion vector predictor (mvp) in the MVP candidate list.

Although using motion vectors from previous frame 310 as MTPs provides the highest degree of parallelism, those skilled in the art will recognize that motion vectors from multiple past frames may be used as predictors. Utilizing the motion vectors from previous frame 310 will provide a PU level parallelism. Further, while the MTPs that have been selected using motion vectors from collocated CTU in previous frame 310, those skilled in the art will recognize the region of extraction can be smaller or larger than the area of previous frame 310. Larger areas have the potential to increase BD-rate performance but increase computations. Moreover, the collocated CTU can be belonging to any reference frame.

In HEVC, regardless of the CTU structure, the encoder must keep a temporal motion vector field of the frame. To reduce the amount of memory, motion vectors are stored in a grid where each cell covers a region of 16×16 pixels. However, it is possible to use all motion vectors associated with a CTU. For example, when a CTU has a size of 64×64, there are 16 temporal motion vectors. These 16 temporal motion vectors are then used as MTPs. The use of the temporal motion vectors to create the MTP list 306 does not increase the processing overhead or cost for the derivation process since the motion vectors of previous frame 310 is already known and stored in memory. In addition, all of the possible MTPs are taken into account and therefore the RD performance loss is reduced.

The motion estimation unit 242 further includes a Multi-Predictor Rate-Constrained Motion Estimation (MP-RCME) unit 312 for determining a motion vector (MV) candidate list 316 for each CTU in parallel with the remaining CTUs. The processing of the MV candidate lists 316 by the MP-RCME unit 312 is performed within a GPU 320.

In the prior art, the derivation of a motion vector predictor (MVP) from neighboring PUs prevented a high degree of parallelism. Further, the usage of an improper MVP in the RCME process has produced an incorrect rate cost that will lead to incorrect optimal motion vector (MV) selection. In embodiments of the present invention, RCME data, determined by MP-RCME unit 312 and derived from each MTP list 306, where each MTP is utilized as a probable MVP determines candidate motion vector, result is a high degree of parallelism while preserving a high coding efficiency. Thus, the dependencies between all the CTUs composing the current frame is eliminated.

However, the CTUs composing the frame are still dependent on the availability of the search region from a reference frame. Hence, for a video encoder that encodes only one frame at the time, the search region is always fully available. Hence, all PUs of this frame can be processed in parallel. Moreover, the RD performance loss is limited by using an appropriate list of MVPs, instead of a single predictor.

As further illustrated in FIG. 3, the mode select unit 243 includes a Rate-Distortion Optimization (RDO) unit 314 for the Best Motion Vector (BMV) 318 from the candidate motion vector list 316 for all CTUs. The processing of the BMV 318 by the RDO unit 314 is performed within CPU 322.

Figure 4:
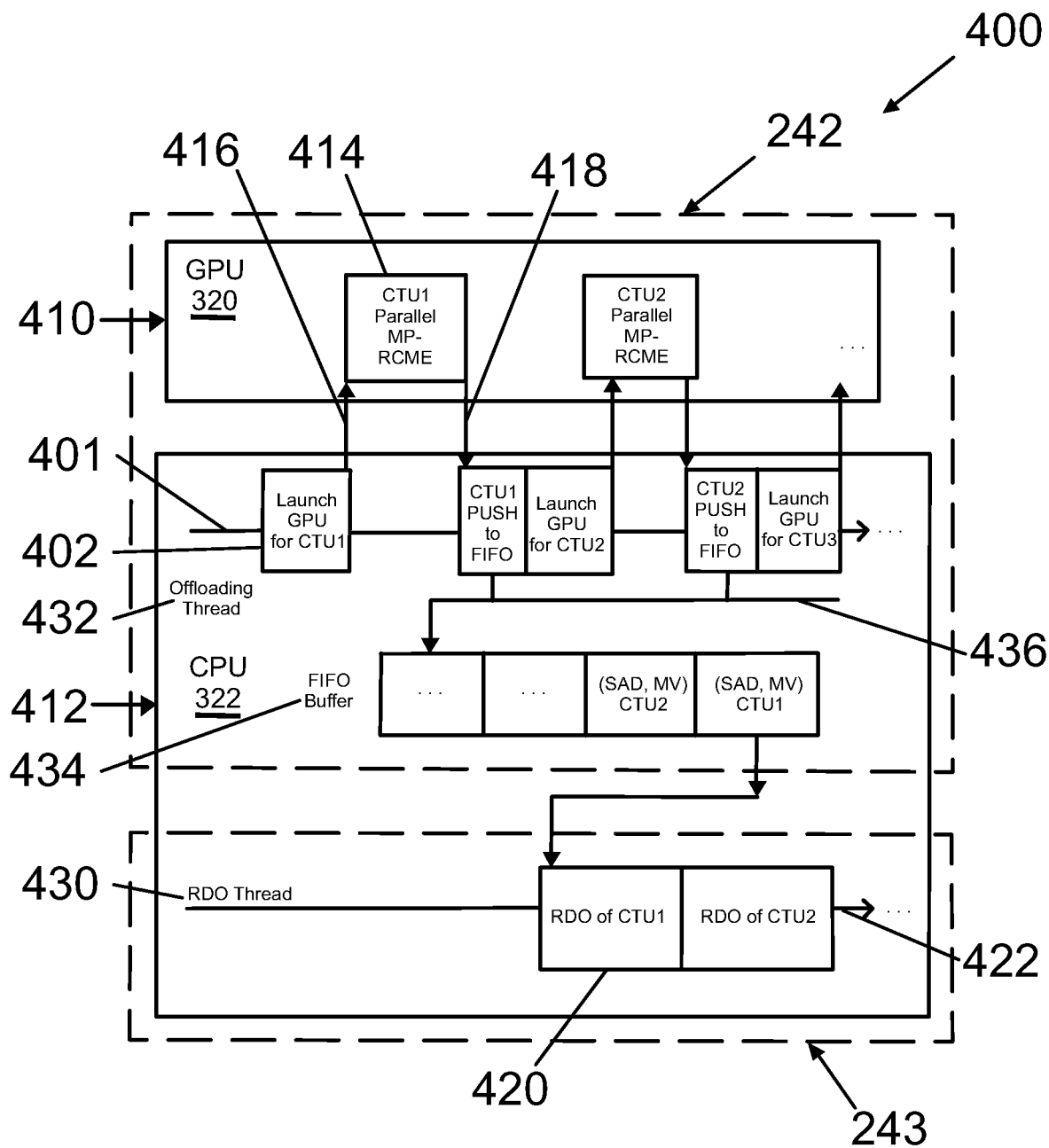
FIG. 4 is an embodiment of a multi-predictor rate-constrained motion vector architecture in accordance to the present invention.
Figure 5:
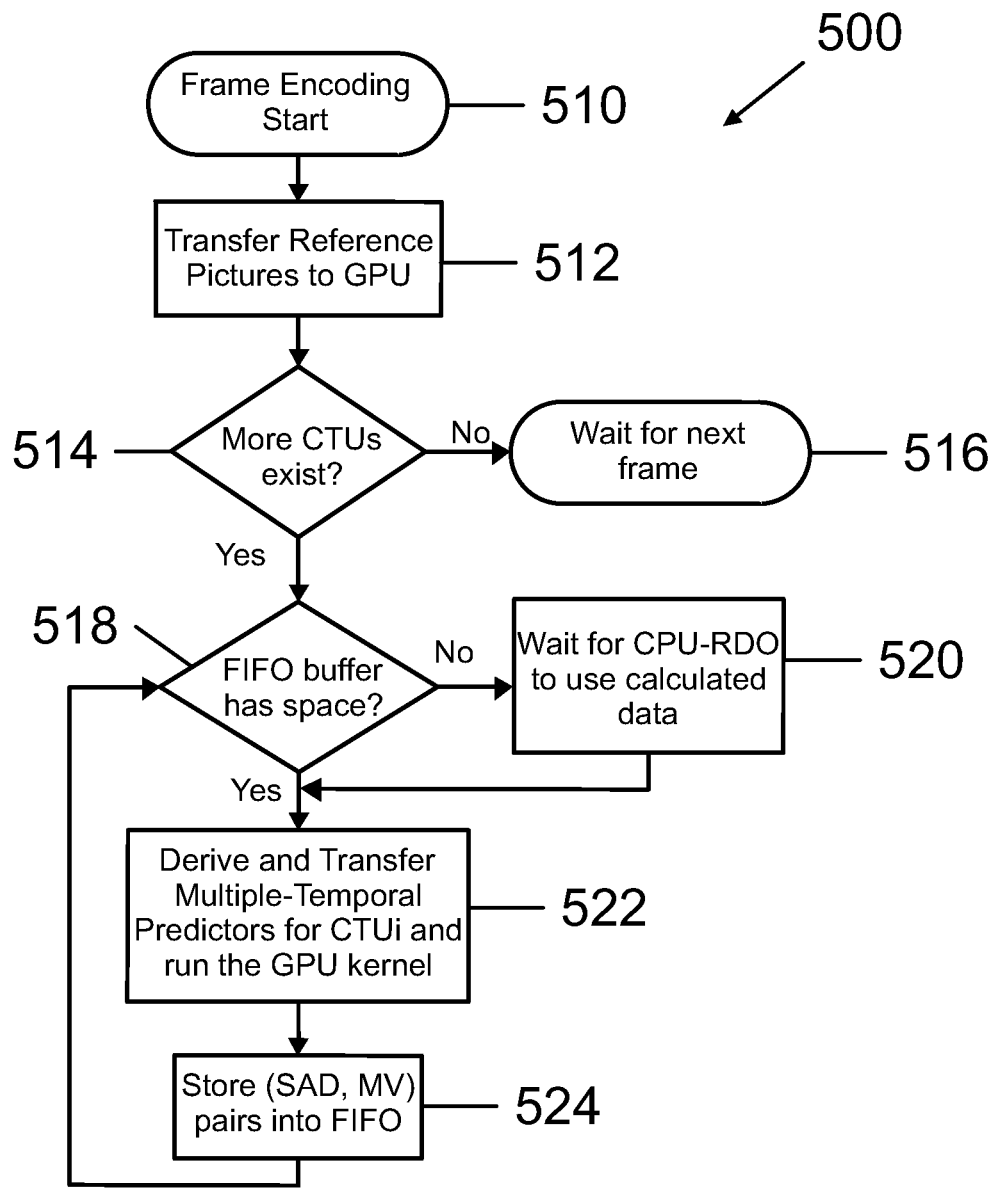
FIG. 5 is a flowchart of an offloading thread in accordance with embodiments of the present invention.

An embodiment of the invention method performing multi-parallel rate-constrained motion estimation in video coding is illustrated in FIGS. 4-5.

In FIG. 4, an embodiment of a multi-parallel rate-constrained motion estimation (MP-RCME) architecture is illustrated. This architecture includes a GPU 320 and a CPU 322. FIG. 4 illustrates a flow of the CTUs that encompasses an embodiment of the method of the present invention. While a more detailed discussion of this embodiment of the method is provided below, in general, CTUs 401 are first passed from CPU 322 to GPU 320, where they are processed. Following this processing, CTUs 401 are passed back to CPU 322 for further processing. CTU 402 is processed in a specific, constant order in GPU 320 at the stage 414 and then in the CPU 322 in the stage 420. While a constant order is illustrated, those skilled in the art will recognize that CTUs 401 can be processed in different orders, especially when high-level parallel tools are used, such as WPP, OWF, tiles and slices. In this embodiment, a first-in first-out (FIFO) queue is used to manage information transferred from GPU to CPU. However, it is possible to use another kind of buffer (vector, map, etc.) to manage this information, especially when high-level parallel tools are used, such as WPP, tiles and slices.

In this embodiment, the rate-distortion optimization (RDO) mode decision is divided into two stages, the GPU-RCME stage 410 and the CPU-RDO stage 412. The two stages are respectively implemented on GPU 320 and CPU 322. However, it is possible to implement these two stages on others parallel architecture, especially on a many-core CPU.

In GPU-RCME stage 410, MP-RCME is performed 414 to allow processing of all PUs/CUs/CTUs of a frame in parallel, resulting in a MV candidate list 418. In CPU-RDO stage 412, rate-distortion optimization is performed with the actual MVP and the MV candidate list 418 for each CTU, resulting in the Best MV 422 for each CTU.

In this embodiment, the frame encoding is executed by two parallel threads in the CPU 322, the first thread 430 is directed toward RDO processing 420 and the second thread 432 is directed toward offloading the workload to GPU. While the use of two threads are used to manage the two stages in this embodiment, such is illustrative. Those skilled in the art will recognize that multiple threads may be used and are within the scope of the present invention. For example, when WPP is enabled, the second stage (CPU-RDO) can be run on several CTUs in parallel by employing several threads. Using two separate threads provides asynchronous execution of CPU and GPU without stall.

In an embodiment of second thread 432 involving the offloading of the workload to the GPU, data is prepared and transferred to the GPU 320 for MP-RCME processing 414. This data includes a MVP list for each CTU which in is made up of MTPs obtained from at least one previous frame.

An embodiment of the execution flow of second thread 432 illustrating the MP-RCME offloading to GPU is shown in FIG. 5.

First, step 510, the frame encoding starts and in step 512, reference pictures are transferred from the CPU 322 to the GPU 320, with reference to FIG. 4. In step 514, a determination is made as to whether additional CTUs exist for the frame to be encoded. If not, the execution flow waits until another frame is presented for encoding. If yes, step 518 determines if there is memory space in the FIFO buffer 434. If the FIFO buffer 434 does not have sufficient memory space, the execution flow waits for memory space to become available following rate-distortion optimization on data in the CPU-RDO stage 412. In step 522, once FIFO buffer 434 has sufficient memory space, MTPs from previous frames for the CTUs are transferred to the GPU 320 for MP-RCMF processing. In step 524, the resulting MP-RCME data 436 is then in FIFO buffer 434. This MP-RCME data 436 is then transferred to the RDO thread 430 where rate-distortion optimization on this data is performed in the CPU-RDO stage 412.

In this embodiment, MP-RCME processing 414 includes the following methodology. Equation 1 above is modified as follows:

$$mv_i = \underset{mv \in MV_{search}}{\operatorname{argmin}} \{D(mv) + \lambda \cdot R(mvp_i - mv)\} \quad (6)$$

$$P_{ME}(mvp_i) = (D(mv_i), mv_i)$$

$$P_{ME}(mvp_i) = (D(mv_i), mv_i)$$

where $mvp_i$ is the $i^{th}$ candidate from a MVP candidate list, where the MVP candidate list is made from a MTP list for a CTU and where each motion vector in the MTP list is considered to be a motion vector predictor in the MVP candidate list:

$$mvp_i \in \{mvp_1, \ldots, mvp_N\} \quad (7)$$

where N is the number of probable candidates. The resulting parameters from Equation 6 are the best rate-constrained motion vector and the corresponding distortion when RCME is performed for $mvp_i$. After this calculation, the resulting $mv_i$ is also called $MVC_i$, since it is calculated based on $MVPC_i$.

Integer motion estimation (ME) is performed on the MVP candidate list in order to reduce the complexity. The fractional pel refinement will be performed in the CPU, when the actual MVP is available. Although the GPU performs integer pel motion estimation and the CPU performs best integer pel motion vector selection and fractional pel refinement, it is also possible to perform fractional pel motion estimation on the GPU and best motion vector selection on the CPU. Thus, the $mv_i$ can be either an integer precision motion vector or a fractional precision motion vector. The best pair in terms of RD is determined in the CPU by the following formula:

$$(mv^*, mvp^*) = \underset{\substack{mv_i, \text{ with } i \in 1\ldots N, \\ mvp \in \{mvp_A, mvp_B\}}}{\operatorname{argmin}} \{D(mv_i) + \lambda \cdot R(mvp - mv_i)\} \quad (8)$$

In this embodiment, equation 8 considers both MVPs ($mvp_A, mvp_B$). However, this is illustrative as those skilled in the art will recognize that it is possible to consider only one MVP, for example, the MVP with the lower cost.

Equation 8 shows that after determination of the actual MVP, the best-assumed candidate, and consequently the best motion vector is determined with significantly less computations.

In additional embodiment, equation 8 may be implemented in a manner to reduce computational complexity in the following manner. First, the list of distortion and motion vector index pairs, i.e. the pairs of $(D(mv_i), mv_i, i)$ for all i values, is sorted in increasing order of jointly calculated cost of motion vector rate and distortion (RDcost), where RDcost is a function expressing a compromise between low distortion and low bit rate, and where is it assumed that the MVP is equal to $mvp_i$ in each case, where i is the index of the $mvp_i$ in the list of MVPs provided originally by the CPU to the GPU which is associated with the optimal $mv_i$. Since the rate-distortion cost $(RDcost(mv,mvp)=D(mv)+\lambda \cdot R(mvp-mv))$, under those assumptions, is computed in the GPU, the verification can be separated in three steps:

if both $mvp_A$, $mvp_B$ are in the list of MVPs, the CPU knows if this is the case since it provides the list of MTP to the GPU, the MVP that appears first in the list is chosen as there is no motion vector cost calculation in the CPU, if one of the $mvp_A$ or $mvp_B$ is in the list, e.g. $mvp_x$ for x corresponds to the $mvp_A$ or $mvp_B$, there is only a need to verify the other MVP on a reduced list of $mv_i$, those with $D(mv_i)<RDcost(mv_x,mvp_x)$, by application of equation 8, neither of $mvp_A$, $mvp_B$ is in the list, utilize equation 8, i.e. test all the MTP, for all i.

Moreover, the full search RCME will be executed efficiently on a GPU because of simple data structures and equal execution paths. The motion estimation is performed by distortion calculation (SAD) of 4×4 blocks. The SAD of bigger blocks is generated by summation of smaller SAD blocks. For each PU and each motion vector predictor, the best motion vector and SAD will be determined according to Equation 6. This embodiment utilized the SAD as distortion metric because integer pel is performed. However, other metrics, such as the SATD and the sum of squared errors (SSE), may be used especially when fractional pel is performed. Also, when both integer and fractional pel precision motion estimations are both performed in GPU, the metrics used for each is performed by distortion calculation (e.g. SAD and SATD respectively) of 4×4 blocks (or other block sizes that can be combined to make larger blocks, e.g. 8×8).

In an additional embodiment of the method of the present invention, the method includes determining a list of multiple temporal predictors (MTPs) for each CTU within a current frame. The determining of the MTPs is performed by a CPU. Further, MTPs may be determined sequentially or not sequentially.

This embodiment also includes performing a multi-predictor rate-constrained motion estimation (MP-RCME) that utilizes the MTP list for each CTU to achieve better RD performance than the prior art methods which utilize a single predictor. For each CTU, a MTP list consists of the set of MVs that are the exact MVs of the collocated CTU in the past frame defined as:

$$mvp_i = mv_{ci}$$

$$MTP = \{mvp_1, \ldots, mvp_N\}, N=16 \quad (9)$$

where $mvp_i$ is a candidate MVP for the current block and is equal to the motion vector in the collocated CTU in the previous frame ($mv_{ct}$).

Although using MVs from the immediate past frame as temporal predictors provides the highest degree of parallelism in building MTP list, those skilled in the art will recognize that the MVPC list may use MVs from past frames in addition to MVs from the above CTUs as predictors. Using the CTUs above provides row-level parallelism instead of a frame-level parallelism. In such case, the MVPC list may be created from a set of motion vectors collected from at least one above row. Moreover, the predictors have been selected using MVs from collocated CTU in the past frame but the region of extraction can be smaller or larger than that area. Larger areas have the potential to increase rate-distortion performance but increase computations. Moreover, the collocated CTU can be belonging to any reference frame.

In HEVC, regardless of the CTU structure, the encoder must keep a temporal MV field of the frame. To reduce the amount of memory, MVs are stored in a grid where each cell covers a region of 16×16 pixels. However, it is possible to use all MVs associated with a CTU. For a CTU of size 64×64, there are 16 temporal MVs which may be used as MTPs. Using the MV's of previous frames does not increase the processing overhead or cost for the derivation process since the MVs of the previous frames are already known and stored in memory. In addition, all of the possible predictors are taken into account and therefore the RD performance loss is reduced.

This embodiment further includes processing in parallel all the CTUs of the whole frame to determine candidate optimal motion vectors for each. The parallel processing of the CTUs is performed by a GPU. The parallel processing of the CTUs is illustrative and not meant to be limiting. Those skilled in the art will recognize that parallel RCME processing may include all PUs/CUs/CTUs of a frame.

For every CTU, for each $mvp_i$, the best motion vector $mv_i$ may be determine as follows:

$$mv_i = \underset{mv \in MV_{search}}{\mathrm{argmin}} \{D(mv) + \lambda \cdot R(mvp_i - mv)\} \qquad (10)$$

where $mvp_i$ is the $i^{th}$ candidate from the MVP candidate list:

$$mvp_i \in \{mvp_1, \ldots, mvp_N\} \qquad (11)$$

$$MV_{search} = \{(x,y)\}, |x| \leq SR, |y| \leq SR \qquad (12)$$

where N is the number of probable candidates. In this embodiment N=16. The resulting parameters from the Equation 10 are the best rate-constrained motion vector and the corresponding distortion when RCME is performed for $mvp_i$. In this embodiment, 16 pairs of distortions and optimal motion vectors (candidate optimal motion vectors) are returned:

$$P_{ME}(mvp_i) = (D(mv_i), mv_i) \qquad (13)$$

In this embodiment, integer ME can be performed for the MVP candidate list in the GPU and perform fractional pel refinement in the CPU, when the actual MVP is available but it may also be possible to perform also fractional pel motion estimation in the GPU and best motion vector selection on the CPU.

This embodiment also includes sequentially processes all the CTUs of the whole frame by a CPU. The best pair in terms of rate-distortion (RD) is determined in the CPU by the following formula:

$$mv = \underset{\substack{i \in 1 \ldots N \\ mvp \in \{mvp_A, mvp_B\}}}{\mathrm{argmin}} \{D(mv_i) + \lambda \cdot R(mvp - mv_i)\} \qquad (14)$$

Equation 14 shows that after determination of the actual MVP (mvp in equation 14), the best-assumed candidate, and consequently the best integer motion vector is determined with significantly less computations (since, from equation 13, the values of $D(mv_i)$ and $mv_i$ are known). Furthermore, as the fractional refinement is just performed for the best integer motion vector as compared to conventional ME, it would not increase the complexity (and this fractional pel refinement can be avoided when performed in the GPU). The process of RCME in the CPU is depicted by the following formula:

$$P_{ME} = (mv^*, mvp^*) = \underset{\substack{\forall mv \in MV_{search}, \\ mvp \in \{mvp_A, mvp_B\}}}{\mathrm{argmin}} \{D(mv) + \lambda \cdot R(mvp - mv)\} \qquad (15)$$

Following this, a single mv, which minimizes equation 14 among all $mv_i$ and possible values of $mvp \in$ the set $\{mvp_A, mvp_B\}$ is determined. In this embodiment, the minimization of equation 14 returns the value of mv and mvp which is either $mvp_A$ or $mvp_B$ that provide minimal value for equation 14. Since we have N=16 values of $mv_i$ and 2 possible values for mvp, i.e. either $mvp_A$ or $mvp_B$, computing all the possibilities requires computing 2N, i.e. 2*16, times equation 6 (i.e. N=16 values of $mv_i$ for each of either $mvp_A$ or $mvp_B$. The best value is the combination of $mv_i$ and mvp that provides minimum value. The computational requirements are minimal as $D(mv_i)$ is known from equation 10.

Moreover, the full search RCME will be executed efficiently on GPU because of simple data structures and equal execution paths. The motion estimation is performed by distortion calculation (SAD) of 4×4 blocks. Further, the SAD of bigger blocks is generated by summation of smaller SAD blocks. For each PU and each motion vector predictor, the best motion vector and SAD will be determined according to Equation 13.

This embodiment is shown by way of the following example.

Pursuant to this embodiment, the MVP list is obtained through processing in a CPU. It is assumed the collocated MVs of the past frame. Table 1 sets out these assumed values:

TABLE 1

| (15, 4) | (12, 3) | (2, 1) | (5, 7) |
|---|---|---|---|
| (12, 2) | (0, 1) | (1, 2) | (2, 2) |
| (3, 2) | (5, 1) | (4, 4) | (2, 3) |
| (3, 8) | (7, 3) | (5, 8) | (3, 3) |

The values are represented in the form of (x,y). Thus, each of them is selected as an $mvp_i$ for the MTP of equation 9:

TABLE 2

| MTP = {(15, 4), (12, 3), (2, 1), (5, 7), (12, 2), (0, 1), (1, 2), (2, 2), (3, 2), (5, 1), (4, 4), (2, 3), (3, 8), (7, 3), (5, 8), (3, 3)} |
|---|

These values are then transferred to the GPU to be used in the calculation of equation 10. For each MVP, a complete rate-constrained motion estimation (MP-RCME) is performed in the Search area. The resulting values are set out in Table 3:

TABLE 3

| | From MTP list | Results of eq (2) | |
|---|---|---|---|
| Index (i) | $mvp_i$ | $D(mv_i)$ | $mv_i$ |
| 1 | (15, 4) | 1510 | (5, 4) |
| 2 | (12, 3) | 1200 | (1, 3) |
| 3 | (2, 1) | 1612 | (6, 1) |
| 4 | (5, 7) | 3402 | (6, 6) |
| 5 | (12, 2) | 1103 | (1, 2) |
| 6 | (0, 1) | 5003 | (7, 1) |
| 7 | (1, 2) | 6001 | (1, 8) |
| 8 | (2, 2) | 2051 | (3, 4) |
| 9 | (3, 2) | 989 | (2, 2) |
| 10 | (5, 1) | 1678 | (0, 1) |
| 11 | (4, 4) | 1234 | (0, 0) |
| 12 | (2, 3) | 3612 | (1, 1) |
| 13 | (3, 8) | 3471 | (2, 4) |
| 14 | (7, 3) | 2110 | (9, 5) |
| 15 | (5, 8) | 1420 | (3, 3) |
| 16 | (3, 3) | 3641 | (2, 1) |

The results are the two last columns (as eq. 13). These will be transferred back to the CPU.

At this point, actual MVPs are available in the CPU. For this example, it is assumed $mvp_A=(3,4)$, $mvp_B=(4,7)$. Further, the cost is defined as:

$$JA_i = D(mv_i) + \lambda \cdot R(mvp_A - mv_i)$$

$$JB_i = D(mv_i) + \lambda \cdot R(mvp_B - mv_i) \quad (7)$$

Where, $JA_i$ is the cost when actual $mvp_A$ is used and $JB_i$ the cost when the $mvp_B$ is used as MVP. To find the best MV from the possible MVs, the following table, Table 4, is calculated according to equation 14:

TABLE 4

| | Results of eq. 10 | | Cost when actual $mvp_A$ is used | Cost when actual $mvp_B$ is used | Lowest cost |
|---|---|---|---|---|---|
| Index (i) | $D(mv_i)$ | $mv_i$ | | | |
| 1 | 1510 | (5, 4) | 1546 | 1582 | 1546 |
| 2 | 1200 | (1, 3) | 1254 | 1326 | 1254 |
| 3 | 1612 | (6, 1) | 1720 | 1756 | 1720 |
| 4 | 3402 | (6, 6) | 3492 | 3456 | 3456 |
| 5 | 1103 | (1, 2) | 1175 | 1247 | 1175 |
| 6 | 5003 | (7, 1) | 5129 | 5165 | 5129 |
| 7 | 6001 | (1, 8) | 6109 | 6073 | 6073 |
| 8 | 2051 | (3, 4) | 2051 | 2123 | 2051 |
| 9 | 989 | (2, 2) | 1043 | 1115 | 1043 |
| 10 | 1678 | (0, 1) | 1786 | 1858 | 1786 |
| 11 | 1234 | (0, 0) | 1360 | 1432 | 1360 |
| 12 | 3612 | (1, 1) | 3702 | 3774 | 3702 |
| 13 | 3471 | (2, 4) | 3489 | 3561 | 3489 |
| 14 | 2110 | (9, 5) | 2236 | 2236 | 2236 |
| 15 | 1420 | (3, 3) | 1438 | 1510 | 1438 |
| 16 | 3641 | (2, 1) | 3713 | 3785 | 3713 |

The row with the minimum of the lowest cost (last column) value will result the final mv. In this example, the row 9 is the best MV with the value of (2,2). It is noted that these calculations are very low complexity compare to step 2 calculations.

In another embodiment of the method of the present invention, the embodiment comprises using a hardware processor for determining a list of at least two Motion Vector Predictor Candidates (MVPC); determining, in parallel for at least two of said at least two MVPCs, corresponding Motion Vector Candidates (MVC) using Rate-Constrained Motion Estimation (RCME); and determining the optimal Motion Vector (MV) among the determined MVCs based on rate distortion optimization.

In this embodiment, the determining of the corresponding MVCs using RCME data for each MVPC may be determined by a rate-constrained motion vector and a corresponding distortion value for each MVPC.

Further in this embodiment, the determining of the optimal MV may include determining the MVC having the lowest rate-distortion cost from the determined MVCs.

Further in this embodiment, the determining of the MVC having the lowest rate-distortion cost from the determined MVCs may include determining a motion vector for each MVPC utilizing the corresponding distortion value for each MVPC and an actual MVP value, and selecting the motion vector having the lowest rate-distortion cost.

Further in this embodiment, the list of at least two MVPCs may be created from a set of motion vectors collected from at least one previously processed frame, the immediately past processed frame, a reference frame and/or at least one collocated block. For purposes of this application, a reference frame is a decoded copy of a previously encoded frame that will be used for inter-prediction of other frames. Additionally, for purposes of this application, a collocated block referred to a CTU block in a reference frame that is in the same location of the current CTU.

Further in this embodiment, the determining, in parallel for at least two of said at least two MVPCs, corresponding Motion Vector Candidates (MVC) using Rate-Constrained Motion Estimation (RCME) is performed within a GPU.

Further in this embodiment, the determining a list of at least two Motion Vector Predictor Candidates (MVPC) and determining the optimal Motion Vector (MV) among the determined MVCs based on rate distortion optimization are performed within a CPU.

As set out above, the calculation of Equation 1 can be performed by different search algorithms, including the exhaustive full search algorithm and more complex sub-optimal algorithms that produce sub-optimal results with less computation. In the prior art, full search is the only search algorithm used for parallel RCME. The main reason is the higher performance of GPU for data parallel algorithms. Moreover, simplicity of implementation of full search in the GPU and possibility of building bottom-up distortions is advantageous. Moreover, in the full search algorithm the starting point of search (also referred as center of search) has less importance because it can be covered by increasing search range.

Sub-optimal search methods are significantly less complex compared to full search methods. However, the number of iterations depends on the selected search center and on the distortion values, producing unequal number of iterations for different PUs. GPU architecture is not able to execute a parallel algorithm efficiently unless it is implemented as single instructions for multiple data paradigm.

Figure 6:
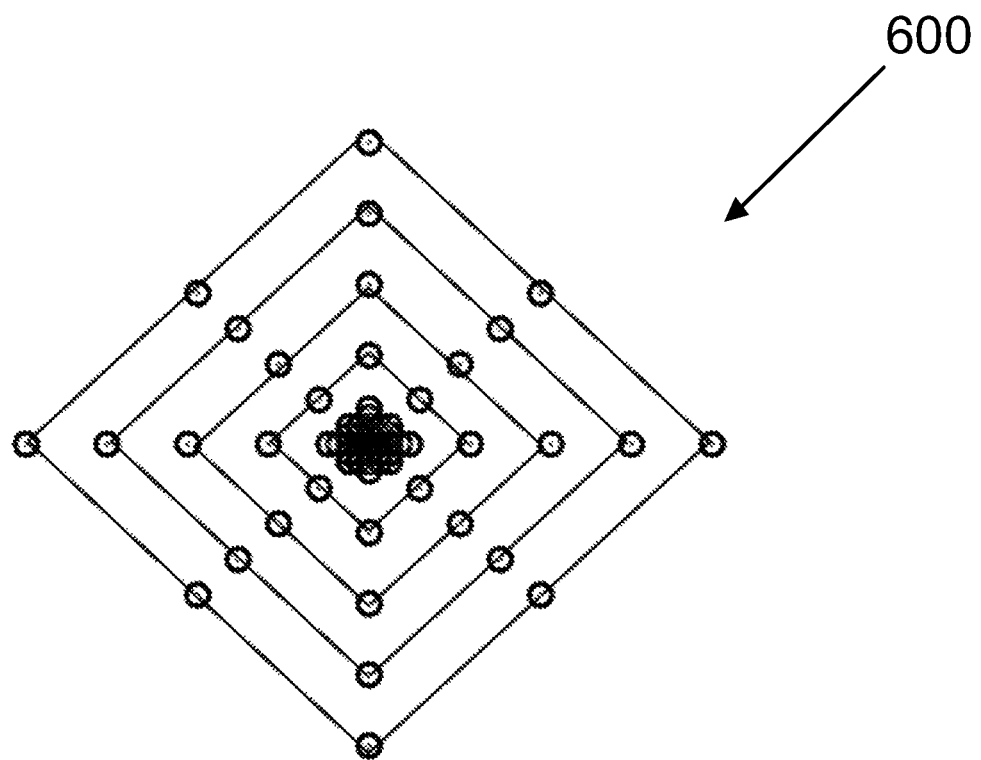
FIG. 6 is an embodiment of a fixed search pattern in accordance with the present invention.
Figure 7:
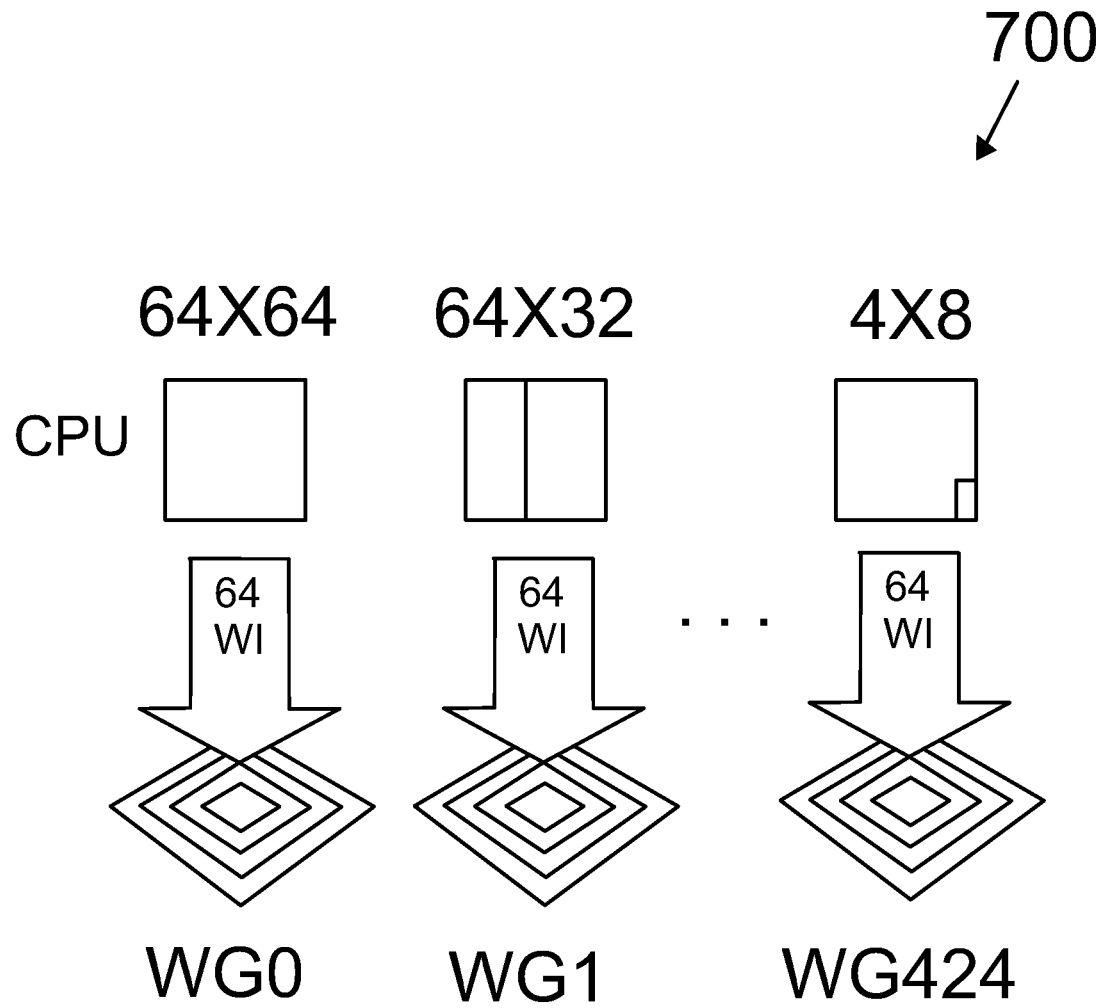
FIG. 7 is an embodiment of job scheduling and work mapping of a CTU in accordance with the present invention.

In FIGS. 6 and 7, an embodiment of a sub-optimal search method is illustrated. The embodiment removes the different execution paths for different PUs and utilizes a set of nested diamond shaped (NDS) search patterns. The sub-optimal search method achieves high execution performance parallel RCME that efficiently utilizes GPU resources. This embodiment defines a fixed modified diamond search pattern 600 with 64 MVs positions as depicted in FIG. 6.

Using this fixed pattern defines the base of the algorithm with fixed number of threads. The number 64 is a multiple of number of threads per wavefront. Thus, each pattern is fitted in one wavefront (for AMD) or two warps (for NVIDIA). Thus, regardless of the hardware in use, the algorithm will be executed in GPU.

This pattern is concentrated in the center and surrounded by four embedded diamond patterns with 8 pixels step. The best MV has usually a distance of less than 4 integer pixels. However, the evaluation of further positions is necessary to prevent falling into local minimum.

Furthermore, one wavefront performs block matching for all the positions of a PU in the NDS pattern. Hence, each thread is calculating the distortion for one of the MVs in the NDS pattern.

After each iteration, if the termination condition is not met, the center is moved to the best position with the lowest cost and another search iteration is performed by the same work group.

Moreover, each CU consists of several PUs but each PU might require a different number of iterations. The algorithm requires special arrangements to prevent performance loss. Thus, the CU is split into all the possible PUs and assign a work group to each PU.

To match the GPU's data-parallel model, the RCME for each PU is defined by a data structure containing the arguments for this process. For each PU, the job structure contains the position of the PU along with its block dimensions and the result is a distortion and MV pair. For a CTU, these job structures are precomputed and stored into arrays. When asymmetric mode partitioning (AMP) is not enabled, each CTU consists of 425 possible PUs and accordingly a work group is assigned to each PU. FIG. 7 depicts job scheduling and work mapping of a CTU 700.

To exploit even more the GPU's processing capabilities, interpolation filtering and fractional pel refinement is performed after the integer motion estimation in the GPU. The reference frames are updated and interpolated in the GPU right after the reconstruction of each frame. A separate GPU kernel is performing the interpolation filter.

The interpolation filter in GPU is implemented as a separable filter. For each pixel, sixteen sub-pel samples are generated. The image is partitioned into one-pixel wide columns with 256 one-pixel rows, and interpolation of each column is done by one work group consisting of 256 work items. Each work item is calculating sixteen subsamples for each pixel.

By way of example, the following is set forth.

To achieve a high execution performance for parallel RCME, the present invention discloses a specific search method for GPU architecture. This specific search method utilizes a nested diamond search (NDS) configuration. NDS is able to utilize GPU resources more efficiently.

NDS is provides a search method for RCME for a hardware with single instruction multiple data (SIMD) or single instruction multiple thread (SIMT) execution architecture. It means several cores executing the same instruction on a different input data.

Currently, the typical GPUs has two terms for a number of threads that are bundled together. NVIDIA call it a "warp" and is 32 threads that are always executing together. AMD call it "wavefront" and is 64 threads. To have efficient execution for these architectures, the number of positions in the NDS pattern should be a multiplication of the number of threads in warp/wavefront. The NDS with 64 positions is currently cover both GPU manufacturers. To generalize NDS for a hardware with SIMD/SIMT execution unit capable of executing W threads (SIMD/SIMT processor will execute W threads altogether), the NDS positions should be rearranged to be equal to W or a multiply of W.

$$N = W*m, m \in \{1, 2, \ldots\} \quad (16)$$

Where, N is the number of NDS positions. For the presented 64 position pattern, m is 1 for AMD and is 2 for NVIDIA to provide an efficient execution on both hardware. The hardware manufacturer specifies the W and NDS algorithm might have to adapt.

Moreover, the number of work items (WIs) in a work group (WG) is equal to N. However, the number of evaluated PUs (or number of WGs) is determined based on HEVC configuration and possible limitations of the hardware. For instance, the Inter-prediction unit of HEVC may decide to ignore some of PUs, thus, it reduces the WG number based on required PUs. As a result, the values of pre-defined table for the tasks for each WG should be updated correspondingly.

Considering the architecture of the GPU, parallel threads are executed in wavefronts of 64 threads. Also, all of the 64 threads in a wavefront should execute the same instruction on different data (data-parallel model). If the algorithm is designed to use fewer than 64 threads, the rest of the resources are wasted and not be able to be used by other processes. Also, if one thread in a wavefront has a different execution path (e.g. because of a conditional statement), all the rest threads in that wavefront are stalled until the mentioned thread is executed. This doubles the execution time.

The prior art suboptimal RCME methods (e.g. Test Zonal Search (TZS) do not satisfy these conditions and therefore are inefficient on a GPU. In inventive NDS defines a fixed search pattern with 64 search positions. This search pattern is a modified diamond search pattern, see FIG. 6.

The positions of NDS pattern are as the following table:

TABLE 5

| | Index | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| X | −2 | −1 | 0 | 1 | 2 | −2 | −1 | 0 | 1 | 2 | −2 | −1 | 0 | 1 | 2 | −2 |
| Y | −2 | −2 | −2 | −2 | −2 | −1 | −1 | −1 | −1 | −1 | 0 | 0 | 0 | 0 | 0 | 1 |

| | Index | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| X | −1 | 0 | 1 | 2 | −2 | −1 | 0 | 1 | 2 | 0 | 3 | −3 | 0 | 0 | 4 | −4 |
| Y | 1 | 1 | 1 | 1 | 2 | 2 | 2 | 2 | 2 | 3 | 0 | 0 | −3 | 4 | 0 | 0 |

TABLE 5-continued

| Index | | | | | | | | | | | | | | | | |
|---|---|---|---|---|---|---|---|---|---|---|---|---|---|---|---|---|
| | 33 | 34 | 35 | 36 | 37 | 38 | 39 | 40 | 41 | 42 | 43 | 44 | 45 | 46 | 47 | 48 |
| X | 0 | 8 | −8 | 0 | 4 | −4 | −4 | 4 | 0 | 16 | −16 | 0 | 8 | −8 | −8 | 8 |
| Y | 8 | 0 | 0 | −8 | 4 | −4 | 4 | −4 | 16 | 0 | 0 | −16 | 8 | −8 | 8 | −8 |

| Index | | | | | | | | | | | | | | | | |
|---|---|---|---|---|---|---|---|---|---|---|---|---|---|---|---|---|
| | 49 | 50 | 51 | 52 | 53 | 54 | 55 | 56 | 57 | 58 | 59 | 60 | 61 | 62 | 63 | 64 |
| X | 0 | 24 | −24 | 0 | 12 | −12 | −12 | 12 | 0 | 32 | −32 | 0 | 16 | −16 | −16 | 16 |
| Y | 24 | 0 | 0 | −24 | 12 | −12 | 12 | −12 | 32 | 0 | 0 | −32 | 16 | −16 | 16 | −16 |

The proposed algorithm uses a fixed pattern of search positions for which a fixed number of threads is called. The number 64 is the number of threads per wavefront. Moreover, each group of 64 threads is called a Work Group (WG) and each thread is a Work Item (WI). It should be noted that the algorithm or program (kernel) for all of the Work Items is the same, the only difference is the data that they work on. Each WI will determine the appropriate portion of data to work on based on its WI index.

For a CTU, there are 425 PUs. For each PU, we assign 64 WIs as shown in FIG. 7. The RCME of each PU is separated from the others; it is done in a group of 64 WIs. Thus, the resources will be available for other PUs when its processing is finished.

Figure 8:
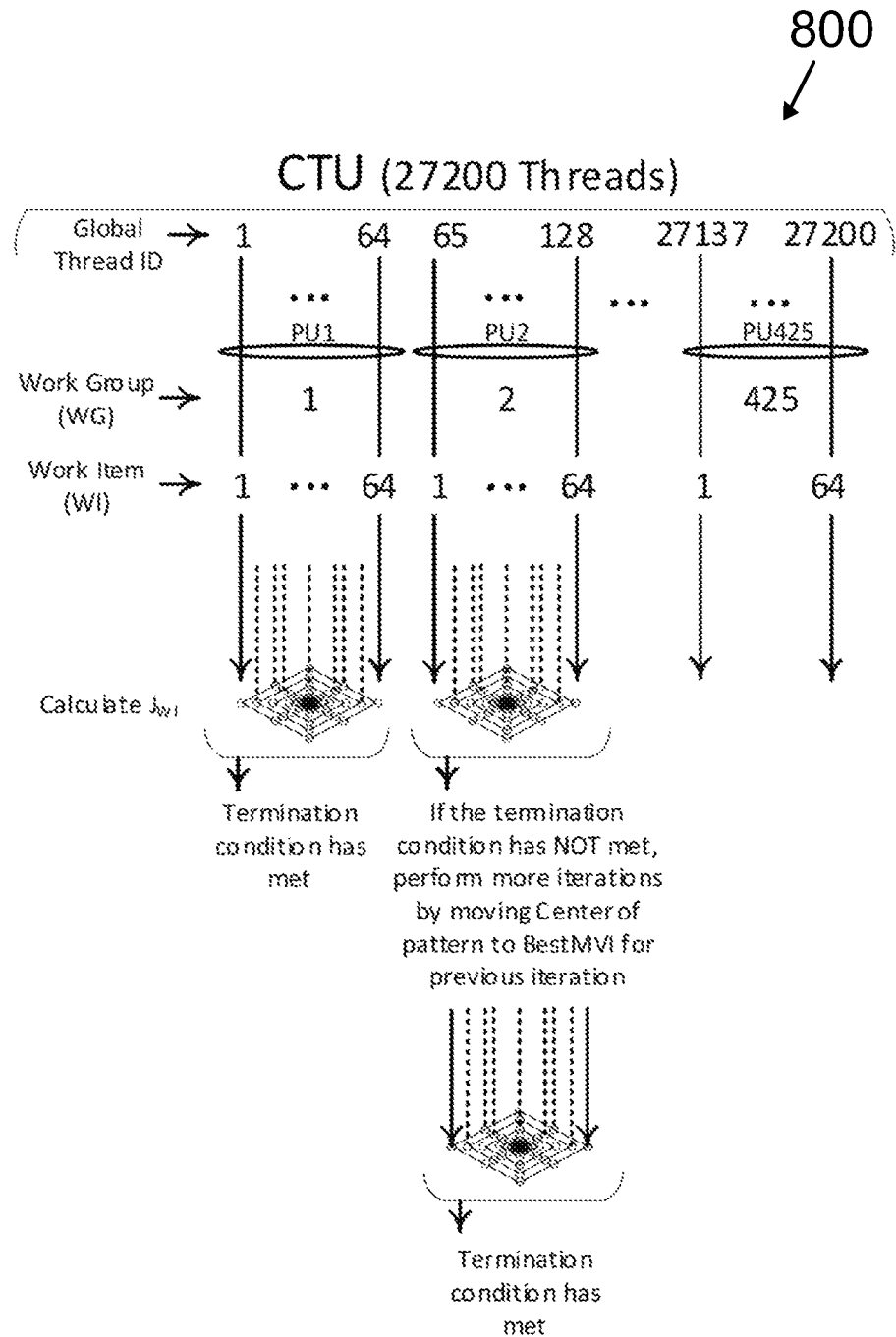
FIG. 8 is a diagram of an embodiment of an iteration flow in accordance with the present invention.

Each PU can have a different number of iterations based on the data it will receive. In the following example, PU1 is completes its work sooner than PU2. Right after PU1 processing is finished, the GPU resources for PU1 will be freed and will be available for other possible processes. However, PU2 will continue until the termination conditions are met. It should be noted that the special arrangement of the algorithm allows this because the algorithm threads 800 are matched on hardware architecture, as shown in FIG. 8.

To have same program (kernel) for all of the threads, the tasks have been pre-defined for each WG. The WG index will determine the location and size of PU. An embodiment of the WG index 900 is shown in FIG. 9.

After determining the PU information, each kernel can determine which search position should be calculated based on its WI index. Each WI is calculating one position of the NDS for a PU with WG index.

Figure 10:
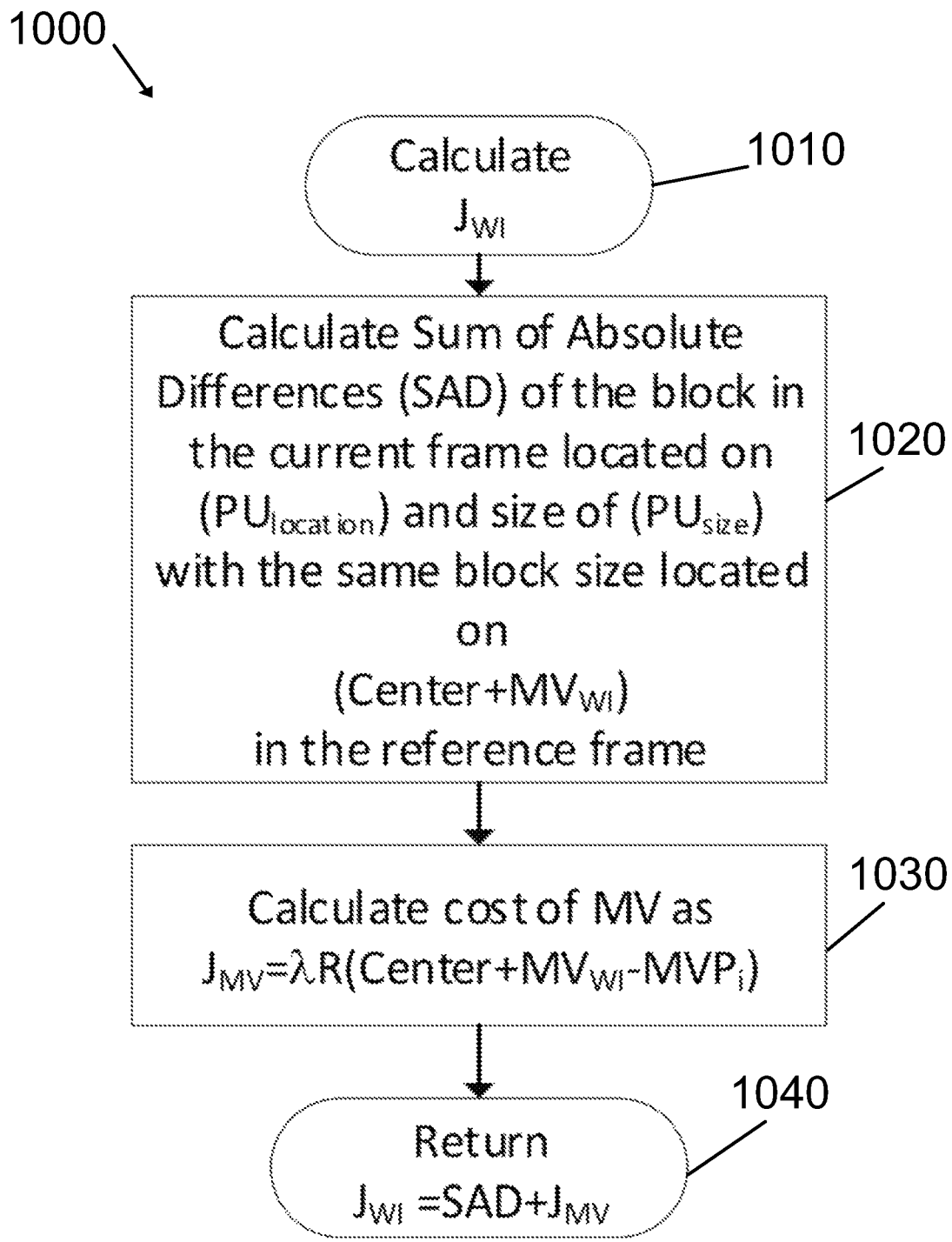
FIG. 10 is a flow diagram of an embodiment of the calculation of cost for each position in accordance with the present invention.

The calculated of cost for each position, $J_{WT}$, is performed. FIG. 10 is an illustration of an embodiment 1000 of this calculation. The calculation 1010 of cost for each position is a complete block matching algorithm. It consists of calculating of the Sum of Absolute Difference of two blocks 1020. The first block is from the original frame. The second block is from a reference frame. The positions and the size of the blocks are already determined based on WI and WG indexes. WG determine the PU information and WI determine the search position. A cost of motion vector signaling based on assumed $MVP_i$ is added to the cost 1030. The result is the calculated cost for each position 1040.

After, all the WIs of a WG have calculated their $J_{WT}$, the minimum of costs among them is found. The termination condition is then checked. If the minimum cost is found in a distance of less than 2 integer pixels with the center of the NDS pattern, it is considered as a final position and there is no need to move the NDS pattern anymore. However, if the best position was found further that 2 integer pixels, the center of NDS should be moved to the new position and the whole search is repeated. We call this an iteration. The algorithm performs a maximum of 3 iterations. After finding the best integer MV, a refinement step is performed in the positions around the best integer MV.

Figure 11:
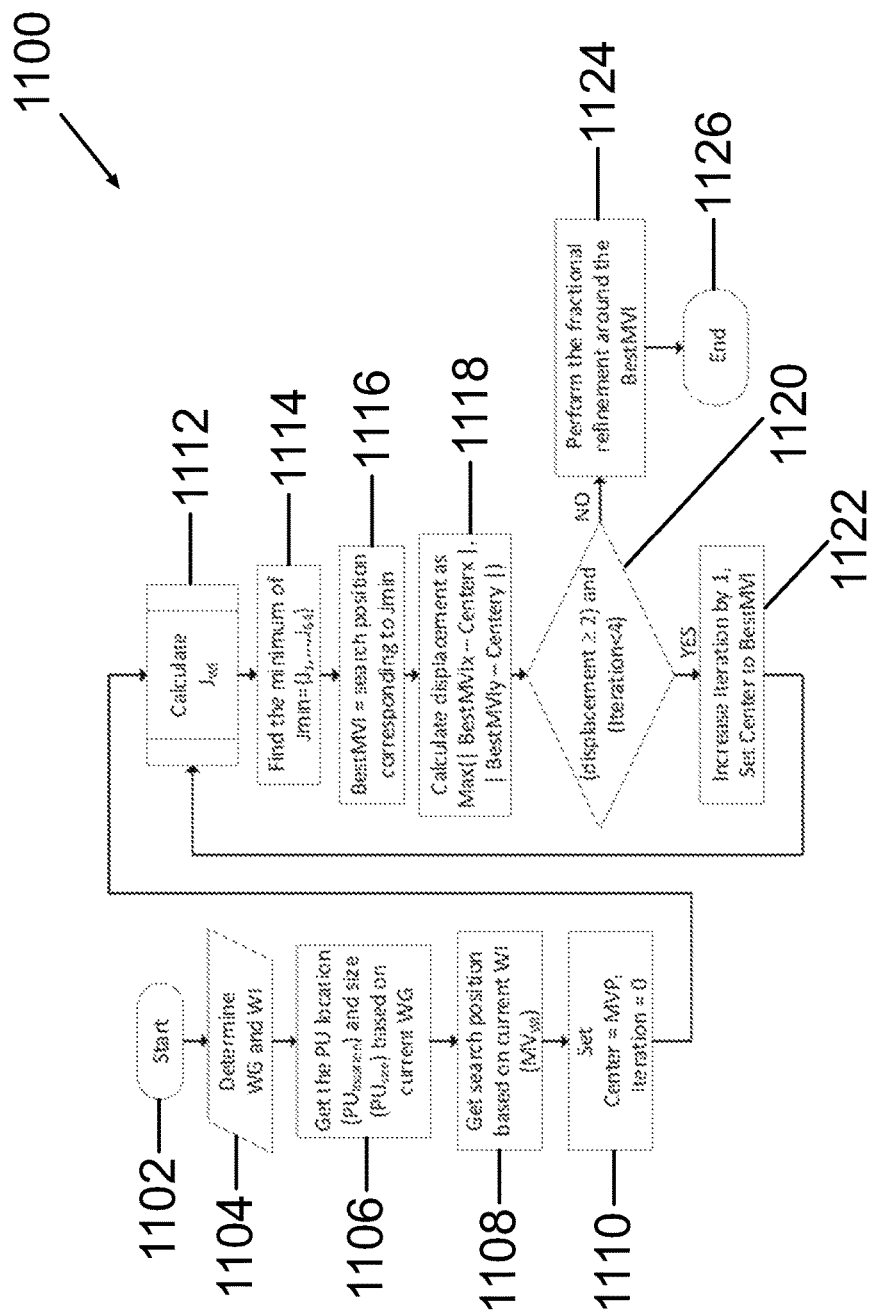
FIG. 11 is a flow diagram of an embodiment of the nested diamond search feature in accordance with the present invention.

FIG. 11 is an illustration of an embodiment 1100 of the algorithm for the determination of the best integer MV. In embodiment 1100, the determination starts at step 1102. At step 1104, the WG and WI are determined. At step 1106, the PU location and size are obtained based on a current WG. At step 1108, the search position is obtained based on the current WI. At step 1110, the center of the search position is set equal to the $MPV_i$ with an iteration equal to zero. At step 1112, the calculated of cost for each position, $J_{WT}$, is performed. At step 1114, the minimum cost, Jmin, is determined. At step 1114, the best integer MV is determined as the search position corresponding to the minimum cost, Jmin. At step 1118, the displacement, or distance from the center of the search pattern is calculated. At step 1120, the termination condition is checked. In this embodiment, the termination condition is when either the distance of the cost of the best integer MV is found less than two integer pixels from the center of the search pattern or if the iteration is less than four iterations. If the termination condition is not met, at step 1122, the center of the search pattern is moved to a new position and the calculation of the cost for each new position is repeated. If the termination condition is met, at step 1124, a fractional refinement is performed around the best integer MV and the algorithm is ended, at step 1126.

Systems of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

Numerous specific details have been set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

It should be noted at the onset that streams of video data and data output from the systems and methods for encoding the streams of video data described herein below are not, in any sense, abstract or intangible. Instead, the data is necessarily digitally encoded and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems on electronically or magnetically stored data, with the results of the data processing and data analysis digitally encoded and stored in one or more tangible, physical, data-storage devices and media.

The invention claimed is:

1. A method for parallel rate-constrained motion estimation in a video encoder, the method comprising:
    determining a first set of Motion Vector Predictor Candidates (MVPC) for each block of a set of blocks from a current frame wherein said first set comprises a set of motion vectors associated with a plurality of blocks from a previously processed frame;
    applying a parallel Rate-Constrained Motion Estimation (RCME) to determine, in parallel Motion Vector Candidates (MVC) corresponding to said first set of MVPCs of each block of said set of blocks; and
    determining an optimal Motion Vector (MV) for each block based on a rate distortion optimization using the determined MVCs and a second set of motion vector predictor candidates derived from a neighboring block of said each block.

2. The method of claim 1, wherein determining in parallel said MVCs using parallel RCME comprises determining a rate-constrained motion vector and a corresponding distortion value for each MVPC.

3. The method of claim 1, wherein determining the optimal MV comprises determining the MVC having the lowest rate-distortion cost from the determined MVCs.

4. The method of claim 3, wherein determining the MVC having the lowest rate-distortion cost from the determined MVCs includes utilizing a corresponding distortion value for each determined MVC and an actual Motion Vector Predictor (MVP) value.

5. The method of claim 1, wherein the first set of MVPCs comprises a set of motion vectors collected from a previously processed frame.

6. The method of claim 1, wherein the first set of MVPCs comprises a set of motion vectors collected from an immediately past processed frame.

7. The method of claim 1, wherein the first set of MVPCs comprises a set of motion vectors collected from a reference frame.

8. The method of claim 1, wherein the first set of MVPCs comprises a set of motion vectors collected from a collocated Coding Tree Unit in the previously processed frame.

9. The method of claim 1, wherein the step of applying the parallel Rate-Constrained Motion Estimation (RCME) to determine, in parallel said Motion Vector Candidates (MVC) corresponding to said first set of MVPCs, is performed within a GPU.

10. The method of claim 1, wherein the steps of determining said first set of Motion Vector Predictor Candidates (MVPC) and determining the optimal Motion Vector (MV) among the determined MVCs based on rate distortion optimization are performed within a CPU.

11. The method of claim 1, wherein the RCME utilizes a sub-optimal search method within a GPU to estimate the MVCs,
    the sub-optimal search method having
    a search pattern having a fixed number of positions, the number of positions being a multiple of the number of threads associated with the GPU, and wherein RCME is performed on all of the threads.

12. The method of claim 11, wherein the search pattern is a nested diamond pattern.

13. The method of claim 1 wherein the applying the parallel-RCME is performed in parallel for a plurality of blocks of said set of blocks.

14. A method for use in a video encoder, the method comprising:
    determining a first set of Motion Vector Predictor Candidates (MVPC) for each of a plurality of Coding Tree Units (CTUs) in a current frame, the first set of MVPCs comprising a set of motion vectors collected from at least one previously processed frame;
    determining, in parallel for said first set of MVPCs, corresponding Motion Vector Candidates (MVC) and related distortion value using a parallel Rate-Constrained Motion Estimation (RCME), wherein said parallel RCME further performs said determination in parallel for said plurality of CTUs; and
    determining an optimal Motion Vector (MV) among the determined MVCs for each of the plurality of Coding Tree Units based on rate distortion optimization, utilizing MVC's corresponding distortion value and an actual MVP value selected from a second set of motion vector predictor candidates derived from a neighboring block of said each of the plurality of CTUs, and selecting the MVC having the lowest rate-distortion cost.

15. A system for determining a best motion vector in a motion estimation process of a video encoder, the system comprising:
    a non-transitory computer-readable storage medium having instructions stored thereon that, when executed, cause a processor to:
    determine a first set of Motion Vector Predictor Candidates (MVPC) for each block of a set of blocks of a current frame;
    determine, in parallel for said first set of MVPCs of each block, corresponding Motion Vector Candidates (MVC) using Rate-Constrained Motion Estimation (RCME), wherein said parallel RCME further performs said determination in parallel for said set of blocks; and
    determine an optimal Motion Vector (MV) for each block among the determined MVCs based on rate distortion optimization using a second set of motion vector predictor candidates derived from a neighboring block of said each block.

16. The system of claim 15, wherein the instructions to cause the processor to determine corresponding MVCs using RCME data for each MVPC cause the processor to: determine a rate-constrained motion vector and a corresponding distortion value for each MVPC.

17. The system of claim 15, wherein the instructions to cause the processor to determine the optimal MV cause the processor to determine the MVC having the lowest rate-distortion cost from the determined MVCs.

18. The system of claim 15, wherein the instructions to cause the processor to determine the MVC having the lowest rate-distortion cost from the determined MVCs cause the processor to:

determine a motion vector for each MVPC utilizing the corresponding distortion value for each MVPC and an actual MVP value; and select the motion vector having the lowest rate-distortion cost.

19. The system of claim 15, wherein the instructions cause the processor to create the first set of MVPCs comprising a set of motion vectors collected from at least one previously processed frame.

20. The system of claim 15, wherein the instructions cause the processor to create the first set of MVPCs comprising a set of motion vectors collected from a reference frame.

21. The system of claim 15, wherein the instructions to cause the processor to determine, in parallel for the first set of MVPCs, corresponding Motion Vector Candidates (MVC) using Rate-Constrained Motion Estimation (RCME) are performed within a GPU.

22. The system of claim 15, wherein the instructions to cause the processor to determine first set of Motion Vector Predictor Candidates (MVPC) and determine the optimal Motion Vector (MV) among the determined MVCs based on rate distortion optimization are performed within a CPU.

23. The system of claim 15, wherein the instructions to cause the processor to determine, in parallel for the first set of MVPCs, corresponding Motion Vector Candidates (MVC) using Rate-Constrained Motion Estimation (RCME), cause the processor to utilize a sub-optimal search method within a GPU to estimate the MVCs;

the sub-optimal search method having a search pattern having a fixed number of positions, the number of positions being a multiple of the number of threads associated with the GPU, and cause to the processor to perform RCME on all of the threads.

24. The system of claim 23, wherein the instructions cause the processor to utilize a sub-optimal search method within a GPU to estimate the MVCs, cause the processor to have the search pattern being a nested diamond pattern.

* * * * *